(12) United States Patent
Kreitinger et al.

(10) Patent No.: US 12,553,789 B2
(45) Date of Patent: Feb. 17, 2026

(54) APPARATUSES AND METHODS FOR ANOMALOUS GAS CONCENTRATION DETECTION

(71) Applicant: Bridger Photonics, Inc., Bozeman, MT (US)

(72) Inventors: Aaron Thomas Kreitinger, Bozeman, MT (US); Michael James Thorpe, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 321 days.

(21) Appl. No.: 18/316,486

(22) Filed: May 12, 2023

(65) Prior Publication Data

US 2023/0314266 A1 Oct. 5, 2023

Related U.S. Application Data

(63) Continuation of application No. 17/408,886, filed on Aug. 23, 2021, now Pat. No. 11,692,900, which is a
(Continued)

(51) Int. Cl.
*G01M 3/18* (2006.01)
*G01J 3/42* (2006.01)
(Continued)

(52) U.S. Cl.
CPC ............ *G01M 3/18* (2013.01); *G01J 3/4338* (2013.01); *G01N 21/39* (2013.01); *G06V 10/30* (2022.01);
(Continued)

(58) Field of Classification Search
CPC .......... G01M 3/18; G01M 3/38; G01J 3/4338; G01J 2003/423; G01N 21/39; G06V 10/30; G01S 17/88
(Continued)

(56) References Cited

U.S. PATENT DOCUMENTS 3,925,666 A 12/1975 Allan et al.
4,167,329 A 9/1979 Jelalian et al.
(Continued)

FOREIGN PATENT DOCUMENTS

CA 3142814 A1 7/2008
CN 205141361 U 4/2016
(Continued)

OTHER PUBLICATIONS

Office Action for Canadian Patent Application No. 3,082,566, dated Mar. 3, 2025, pp. all.
(Continued)

*Primary Examiner* — Md M Rahman
(74) *Attorney, Agent, or Firm* — Dorsey & Whitney LLP

(57) ABSTRACT

Embodiments of the disclosure are drawn to apparatuses and methods for anomalous gas concentration detection. A spectroscopic system, such as a wavelength modulated spectroscopy (WMS) system may measure gas concentrations in a target area. However, noise, such as speckle noise, may interfere with measuring relatively low concentrations of gas, and may lead to false positives. A noise model, which includes a contribution from a speckle noise model, may be used to process data from the spectroscopic system. An adaptive threshold may be applied based on an expected amount of noise. A speckle filter may remove measurements which are outliers based on a measurement of their noise. Plume detection may be used to determine a presence of gas plumes. Each of these processing steps may be associated with a confidence, which may be used to determine an overall confidence in the processed measurements/gas plumes.

30 Claims, 9 Drawing Sheets

Related U.S. Application Data continuation of application No. 16/763,955, filed as application No. PCT/US2018/061120 on Nov. 14, 2018, now Pat. No. 11,112,308.

(60) Provisional application No. 62/586,008, filed on Nov. 14, 2017.

(51) Int. Cl.
  G01J 3/433   (2006.01)
  G01N 21/39   (2006.01)
  G01S 17/88   (2006.01)
  G06V 10/30   (2022.01)

(52) U.S. Cl.
  CPC ......... G01J 2003/423 (2013.01); G01S 17/88 (2013.01)

(58) Field of Classification Search
  USPC ....................................................... 356/437
  See application file for complete search history.

(56) References Cited

U.S. PATENT DOCUMENTS

| | | |
|---|---|---|
| 4,551,004 A | 11/1985 | Paraskevopoulos |
| 4,593,368 A | 6/1986 | Fridge et al. |
| 4,732,156 A | 3/1988 | Nakamura |
| 4,795,253 A | 1/1989 | Sandridge et al. |
| 4,830,486 A | 5/1989 | Goodwin |
| 5,115,468 A | 5/1992 | Asahi et al. |
| 5,294,075 A | 3/1994 | Vertatschitsch et al. |
| 5,298,751 A | 3/1994 | Fee et al. |
| 5,367,399 A | 11/1994 | Kramer |
| 5,371,587 A | 12/1994 | De Groot et al. |
| 5,534,993 A | 7/1996 | Ball et al. |
| 5,548,402 A | 8/1996 | Nogiwa |
| 5,768,001 A | 6/1998 | Kelley et al. |
| 5,859,694 A | 1/1999 | Galtier et al. |
| 6,034,976 A | 3/2000 | Mossberg et al. |
| 6,516,014 B1 | 2/2003 | Sellin et al. |
| 6,822,742 B1 | 11/2004 | Kalayeh et al. |
| 6,864,983 B2 | 3/2005 | Galle et al. |
| 7,215,413 B2 | 5/2007 | Soreide et al. |
| 7,292,347 B2 | 11/2007 | Tobiason et al. |
| 7,511,824 B2 | 3/2009 | Sebastian et al. |
| 7,742,152 B2 | 6/2010 | Hui et al. |
| 7,920,272 B2 | 4/2011 | Sebastian et al. |
| 8,010,300 B1 | 8/2011 | Stearns et al. |
| 8,081,670 B2 | 12/2011 | Belsley |
| 8,121,798 B2 | 2/2012 | Lippert et al. |
| 8,175,126 B2 | 5/2012 | Rakuljic et al. |
| 8,294,899 B2 | 10/2012 | Wong |
| 8,582,085 B2 | 11/2013 | Sebastian et al. |
| 8,730,461 B2 | 5/2014 | Andreussi |
| 8,781,755 B2 | 7/2014 | Wong |
| 8,913,636 B2 | 12/2014 | Roos et al. |
| 9,030,670 B2 | 5/2015 | Warden et al. |
| 9,098,754 B1 | 8/2015 | Stout et al. |
| 9,559,486 B2 | 1/2017 | Roos et al. |
| 9,696,423 B2 | 7/2017 | Martin |
| 9,759,597 B2 | 9/2017 | Wong |
| 9,784,560 B2 | 10/2017 | Thorpe et al. |
| 9,864,060 B2 | 1/2018 | Sebastian et al. |
| 9,970,756 B2 | 5/2018 | Kreitinger et al. |
| 10,247,538 B2 | 4/2019 | Roos et al. |
| 10,928,182 B2 | 2/2021 | Roos et al. |
| 11,105,621 B2 | 8/2021 | Kreitinger et al. |
| 11,112,308 B2 | 9/2021 | Kreitinger et al. |
| 11,391,567 B2 | 7/2022 | Thorpe et al. |
| 11,422,244 B2 | 8/2022 | Thorpe et al. |
| 11,422,258 B2 | 8/2022 | Thorpe et al. |
| 11,592,563 B2 | 2/2023 | Roos et al. |
| 11,656,075 B2 | 5/2023 | Kreitinger et al. |
| 12,066,353 B2 | 8/2024 | Thorpe et al. |
| 2002/0071122 A1 | 6/2002 | Kulp et al. |
| 2003/0043437 A1 | 3/2003 | Stough et al. |
| 2004/0088113 A1 | 5/2004 | Spoonhower et al. |
| 2004/0105087 A1 | 6/2004 | Gogolla et al. |
| 2005/0078296 A1 | 4/2005 | Bonnet |
| 2005/0094149 A1 | 5/2005 | Cannon |
| 2006/0050270 A1 | 3/2006 | Elman |
| 2006/0162428 A1 | 7/2006 | Hu et al. |
| 2006/0203224 A1 | 9/2006 | Sebastian et al. |
| 2008/0018881 A1 | 1/2008 | Hui et al. |
| 2008/0018901 A1 | 1/2008 | Groot |
| 2009/0046295 A1 | 2/2009 | Kemp et al. |
| 2009/0110004 A1 | 4/2009 | Chou et al. |
| 2009/0153872 A1 | 6/2009 | Sebastian et al. |
| 2009/0257622 A1 | 10/2009 | Wolowelsky et al. |
| 2010/0007547 A1 | 1/2010 | D'Addio |
| 2010/0091278 A1 | 4/2010 | Liu et al. |
| 2010/0131207 A1 | 5/2010 | Lippert et al. |
| 2010/0141261 A1 | 6/2010 | Overby et al. |
| 2011/0069309 A1 | 3/2011 | Newbury et al. |
| 2011/0164783 A1 | 7/2011 | Hays et al. |
| 2011/0188029 A1 | 8/2011 | Schmitt et al. |
| 2011/0205523 A1 | 8/2011 | Rezk et al. |
| 2011/0213554 A1 | 9/2011 | Archibald et al. |
| 2011/0273699 A1 | 11/2011 | Sebastian et al. |
| 2011/0292403 A1 | 12/2011 | Jensen et al. |
| 2012/0038930 A1 | 2/2012 | Sesko et al. |
| 2012/0106579 A1 | 5/2012 | Roos et al. |
| 2012/0274938 A1 | 11/2012 | Ray |
| 2012/0293358 A1 | 11/2012 | Itoh |
| 2013/0104661 A1 | 5/2013 | Klotz et al. |
| 2013/0162976 A1 | 6/2013 | Dakin et al. |
| 2014/0002639 A1 | 1/2014 | Cheben et al. |
| 2014/0036252 A1 | 2/2014 | Amzajerdian et al. |
| 2014/0139818 A1 | 5/2014 | Sebastian et al. |
| 2014/0204363 A1 | 7/2014 | Slotwinski et al. |
| 2015/0019160 A1 | 1/2015 | Thurner et al. |
| 2015/0059444 A1 | 3/2015 | Rella |
| 2015/0185313 A1 | 7/2015 | Zhu |
| 2015/0355327 A1 | 12/2015 | Goodwin et al. |
| 2016/0033643 A1 | 2/2016 | Zweigle et al. |
| 2016/0123718 A1 | 5/2016 | Roos et al. |
| 2016/0123720 A1 | 5/2016 | Thorpe et al. |
| 2016/0131514 A1 | 5/2016 | Babin et al. |
| 2016/0202225 A1 | 7/2016 | Feng et al. |
| 2016/0259038 A1 | 9/2016 | Retterath et al. |
| 2016/0261091 A1 | 9/2016 | Santis et al. |
| 2016/0329681 A1 | 11/2016 | Tulip |
| 2017/0089829 A1 | 3/2017 | Bartholomew |
| 2017/0097274 A1 | 4/2017 | Thorpe et al. |
| 2017/0097302 A1 | 4/2017 | Kreitinger et al. |
| 2017/0115218 A1 | 4/2017 | Huang et al. |
| 2017/0131394 A1 | 5/2017 | Roger et al. |
| 2017/0146335 A1 | 5/2017 | Martinez et al. |
| 2017/0168161 A1 | 6/2017 | Shapira et al. |
| 2017/0171397 A1 | 6/2017 | Mitsumori et al. |
| 2017/0191898 A1 | 7/2017 | Rella et al. |
| 2017/0343333 A1 | 11/2017 | Thorpe et al. |
| 2018/0188369 A1 | 7/2018 | Sebastian et al. |
| 2018/0216932 A1 | 8/2018 | Kreitinger et al. |
| 2018/0224548 A1 | 8/2018 | Hariyama et al. |
| 2018/0284015 A1 | 10/2018 | Imade et al. |
| 2019/0013862 A1 | 1/2019 | He et al. |
| 2019/0086517 A1 | 3/2019 | Puglia et al. |
| 2019/0170500 A1 | 6/2019 | Roos et al. |
| 2019/0285409 A1 | 9/2019 | Kreitinger et al. |
| 2019/0383596 A1 | 12/2019 | Thorpe et al. |
| 2020/0011994 A1 | 1/2020 | Thorpe et al. |
| 2020/0149883 A1 | 5/2020 | Thorpe et al. |
| 2020/0182978 A1 | 6/2020 | Maleki et al. |
| 2020/0241139 A1 | 7/2020 | Roos et al. |
| 2020/0278432 A1 | 9/2020 | Thorpe et al. |
| 2020/0355552 A1 | 11/2020 | Kreitinger et al. |
| 2021/0055180 A1 | 2/2021 | Thorpe et al. |
| 2021/0190953 A1 | 6/2021 | Roos et al. |
| 2021/0293960 A1 | 9/2021 | Kreitinger et al. |
| 2022/0034718 A1 | 2/2022 | Kreitinger et al. |
| 2022/0057202 A1 | 2/2022 | Kreitinger et al. |
| 2022/0412732 A1 | 12/2022 | Thorpe et al. |

(56) References Cited

U.S. PATENT DOCUMENTS

| | | | |
|---|---|---|---|
| 2023/0228876 | A1 | 7/2023 | Roos et al. |
| 2023/0243648 | A1 | 8/2023 | Kreitinger et al. |
| 2024/0361200 | A1 | 10/2024 | Thorpe et al. |

FOREIGN PATENT DOCUMENTS

| | | |
|---|---|---|
| FR | 2691809 A1 | 12/1993 |
| WO | 2010127151 A2 | 11/2010 |
| WO | 2012037157 A2 | 3/2012 |
| WO | 2014088650 A1 | 6/2014 |
| WO | 2016064897 A1 | 4/2016 |
| WO | 2017187510 A1 | 11/2017 |
| WO | 2018067158 A1 | 4/2018 |
| WO | 2018170478 | 9/2018 |
| WO | 2018170478 A1 | 9/2018 |
| WO | 2019060901 A1 | 3/2019 |
| WO | 2019070751 A1 | 4/2019 |
| WO | 2019079448 A1 | 4/2019 |
| WO | 2019099567 | 5/2019 |

OTHER PUBLICATIONS

Wilson, J.D., et al., "Ground-to-air Gas Emission Rate Inferred from Measured Concentration Rise within a Disturbed Atmospheric Surface Layer", Journal of Applied Meteorology and Climatology, vol. 49, pp. 1818-1830, Sep. 2010.
International Search Report and Written Opinion dated Aug. 1, 2018 for PCT Application No. PCT/US2018/023004, 18 pgs, pp. all.
International Search Report and Written Opinion dated Jan. 29, 2019 for PCT Application No. PCT/US2018/052682, 16 pgs, pp. all.
International Search Report and Written Opinion dated Mar. 15, 2019 for PCT Application No. PCT/US2018/061120; 17 pgs, pp. all.
International Search Report and Written Opinion dated Nov. 30, 2018 for PCT Application No. PCT/US2018/054016, 18 pages, pp. all.
International Search Report and Written Opinion for Application No. PCT/US2019/042422, dated Oct. 24, 2019, pp. all.
International Search Report dated Feb. 16, 2016 for International Application No. PCT/US2015/057814, pp. all.
International Search Report dated Jan. 19, 2016 for International Application No. PCT/US2015/058051, pp. all.
Written Opinion of the International Searching Authority: PCT application No. PCT/US2018/023004 dated Aug. 1, 2018, pp. all.
International Search Report and Written Opinion for PCT Application No. PCT/US2018/056285 dated Dec. 20, 2018, pp. all.
International Search Report and Written Opinion received for PCT/US2015/057814 dated Feb. 16, 2016, pp. all.
International Search Report and Written Opinion received for PCT/US2015/058051 dated Jan. 19, 2016, pp. all.
Amann, et al., "Laser ranging: a critical review of usual techniques for distance measurement," Optical Engineering, vol. 40(1) pp. 10-19 (Jan. 2001). all.
Barber, et al., "Accuracy of Active Chirp Linearization for Broadband Frequency Modulated Continuous Wave Ladar," Applied Optics, vol. 49, No. 2, pp. 213-219 (Jan. 2010).
Barker, "Performance enhancement of intensity-modulated laser rangefinders on natural surfaces", SPIE vol. 5606, pp. 161-168 (Dec. 2004).
Baumann, et al., "Speckle Phase Noise in Coherent Laser Ranging: Fundamental Precision Limitations," Optical Letters, vol. 39, Issue 16, pp. 4776-4779 (Aug. 2014).
Boashash, "Estimating and Interpreting the Instantaneous Frequency of a Signal—Part 2: Algorithms and Applications", Proceedings of the IEEE, vol. 80, No. 4, pp. 540-568 (Apr. 1992).
Bomse, et al., "Frequency modulation and wavelength modulation spectroscopies: comparison of experimental methods using a lead-salt diode laser", Appl. Opt., 31, pp. 718-731 (Feb. 1992).
Cao, et al., "Etalon Effects Analysis in Tunable Diode Laser Absorption Spectroscopy Gas Concentration Detection System Based on Wavelength Modulation Spectroscopy", 2010 Symposium on Photonics and Optoelectronics, 2010, pp. 1-5.
Choma, et al., "Sensitivity Advantage of Swept Source and Fourier Domain Optical Coherence Tomography" Optical Express, vol. 11, No. 18, 2183 (Sep. 2003), pp. all.
Ciurylo, "Shapes of pressure- and Doppler-broadened spectral lines in the core and near wings", Physical Review A, vol. 58 No. 2, pp. 1029-1039 (Aug. 1998).
Dharamsi, "A theory of modulation spectroscopy with applications of higher harmonic detection", J. Phys. D: Appl. Phys 29, pp. 540-549 (Jun. 1995;1996) (Retrieved Jan. 16, 2017).
Emran, Bara J., et al., "Low-Altitude Aerial Methane Concentration Mapping", School of Engineering, The University of British Columbia, Aug. 10, 2017, pp. 1-12.
Fehr, et al., "Compact Covariance Descriptors in 3D Point Clouds for Object Recognition", 2012 IEEE International Conference on Robotics and Automation, pp. 1793-1798, (May 2012).
Fransson, Karin, et al., "Measurements of VOCs at Refineries Using the Solar Occultation Flux Technique", Department of Radio and Space Science, Chalmers University of Technology, pp. 1-19.
Fujima, et al., "High-resolution distance meter using optical intensity modulation at 28 GHz", Meas. Sci. Technol. 9, pp. 1049-1052 (May 1998).
Gilbert, et al., "Hydrogen Cyanide H13C14N Absorption Reference for 1530 nm to 1565 nm Wavelength Calibration—SRM 2519a", NIST Special Publication 260-137 2005 ED, 29 pages, (Aug. 2005).
Iiyama, et al., "Linearizing Optical Frequency-Sweep of a Laser Diode for FMCW Reflectrometry", Iiyama et al. Journal of Lightwave Technology, vol. 14, No. 2, Feb. 1996.
Iseki, et al., "A Compact Remote Methane Sensor using a Tunable Diode Laser", Meas. Sci. Technol., 11, 594, pp. 217-220 (Jun. 2000).
Jia-Nian, et al., "Etalon effects analysis in tunable diode laser absorption spectroscopy gas concentration detection system based on wavelength modulation spectroscopy", IEEE Sopo, pp. 1-5 (Jul. 2010).
Johnson, et al., "Using Spin-Images for Efficient Object Recognition in Cluttered 3D Scenes", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al., Applied Optics, vol. 38, No. 15, May 20, 1999, pp. 3376-3386.
Karmacharya, et al., "Knowledge guided object detection and indentification in 3D point clouds", SPIE 9528, 952804-952804-13 (Jun. 2015).
Lenz, Dawn, et al., "Flight Testing of an Advanced Airborne Natural Gas Leak Detection System", ITT Industries Space Systems Division, pp. all.
Lu, et al., "Differential wavelength-scanning heterodyne interferometer for measuring large step height", Applied Optics, vol. 41, No. 28, Oct. 1, 2002.
Masiyano, et al., "Use of diffuse reflections in tunable diode laser absorption spectroscopy: implications of laser speckle for gas absorption measurements", Appl. Phys. B 90, pp. 279-288 (Feb. 2008).
Mather, T.A., et al., "A reassessment of current volcanic emissions from the Central American arc with specific examples from Nicaragua", Journal of Volcanology and Geothermal Research, pp. 297-311.
Ngo, et al., "An isolated line-shape model to go beyond the Voigt profile in spectroscopic databases and radiative transfer codes", Journal of Quantitative Spectroscopy and Radiative Transfer, 129, pp. 89-100 (Nov. 2013).
Olsovsky, et al., "Chromatic Confocal Microscopy for Multi-depth Imaging of Epithelial Tissue", Biomedical Optics Express, vol. 4, No. 5, pp. 732-740 (May 2013).
Paffenholz, "Direct geo-referencing of 3D point clouds with 3D positioning sensors", (Doctoral Thesis), Leibniz Universität Hannover, 138 pages (Sep. 2012).

(56) References Cited

OTHER PUBLICATIONS

Polyanksy, et al., "High-Accuracy CO2 Line Intensities Determined from Theory and Experiment", Physical Review Letters, 114, 5 pages (Jun. 2015).
Rao, "Information and the accuracy attainable in the estimatin of statistical parameters", Bull. Calcutta Math. Soc., 37,pp. 81-89 (1945, reprinted 1992) (Retrieved Jan. 10, 2017).
Riris, et al., "Airborne measurements of atmospheric methane column abundance using a pulsed integrated-path differential absorption lidar", Applied Optics, vol. 51, No. 34, pp. 8296-8305 (Dec. 2012).
Roos, et al., "Ultrabroadband optical chirp linearization for precision metrology application", Optics Letters, vol. 34 No. 23, pp. 3692-3694 (Dec. 2009).
Roos, et al., "Ultrabroadband optical chirp linearization for precision metrology applications", Optics Letters, vol. 34, Issue 23, pp. 3692-3694 (2009).
Rothman, et al., "The HITRAN 2008 molecular spectroscopic database", Journal of Quantitative Spectroscopy & Radiative Transfer, 110, pp. 533-572 (Jul. 2009).
Rusu, et al., "Fast Point Feature Histograms (FPFH) for 3D Registration", IEEE Int. Conf. Robot., pp. 3212-3217 (May 2009).
Sandsten, et al., "Volume flow calculations on gas leaks imaged with infrared gas-correlation", Optics Express, vol. 20, No. 18, pp. 20318-20329 (Aug. 2012).
Sheen, et al., "Frequency Modulation Spectroscopy Modeling for Remote Chemical Detection." PNNL 13324 (Sep. 2000).
Sheen, "Frequency Modulation Spectroscopy Modeling for Remote Chemical Detection", PNNL 13324, 51 pages (Sep. 2000).
Silver, "Frequency-modulation spectroscopy for trace species detection: theory and comparison among experimental methods", Appl. Opt., vol. 31 No. 6, pp. 707-717 (Feb. 1992).
Sirat, et al., "Conoscopic Holography" Optics Letters, vol. 10, No. 1 (Jan. 1985), pp. all.
Sivananthan, "Integrated Linewidth Reduction of Rapidly Tunable Semiconductor Lasers" Sivananthan, Abirami, Ph.D., University of California, Santa Barbara, 2013, 206; 3602218.
Stone, et al., "Performance Analysis of Next-Generation LADAR for Manufacturing, Construction, and Mobility" NISTIR 7117 (May 2004).
Thoma, Eben D., et al., "Open-Path Tunable Diode Laser Absorption Spectroscopy for Acquisition of Fugitive Emission Flux Data", Journal of the Air & Waste Management Association (vol. 55), Mar. 1, 2012, pp. 658-668. all.
Twynstra, et al., "Laser-absorption tomography beam arrangement optimization using resolution matrices", Applied Optics, vol. 51, No. 29, pp. 7059-7068 (Oct. 2012).
Xi, et al., "Generic real-time uniorm K-space sampling method for high-speed swept-Source optical cohernece tomography", Optics Express, vol. 18, No. 9, pp. 9511-9517 (Apr. 2010).
Zakrevskyy, et al., "Quantitative calibration- and reference-free wavelength modulation spectroscopy", Infrared Physics & Technology, 55, pp. 183-190 (Mar. 2012).
Zhao, et al., "Calibration-free wavelength-modulation spectroscopy based on a swiftly determined wavelength-modulation frequency response function of a DFB laser", Opt. Exp., vol. 24 No. 2, pp. 1723-1733 (Jan. 2016).
Zhao, Yanzeng, et al., "Lidar Measurement of Ammonia Concentrations and Fluxes in a Plume from a Point Source", Cooperative Institute for Research in Environmental Studies, University of Colorado/NOAA (vol. 19), 1928-1938.
Office Action for Canadian Patent Application No. 3,088,983, dated Feb. 7, 2025, pp. all.
Office Action for Canadian Patent Application No. 3,078,553, dated Dec. 3, 2024, pp. all.

APPARATUSES AND METHODS FOR ANOMALOUS GAS CONCENTRATION DETECTION

CROSS-REFERENCE TO RELATED APPLICATION(S)

This application is a continuation of U.S. patent application Ser. No. 17/408,886, filed on Aug. 23, 2021, which is a continuation of U.S. patent application Ser. No. 16/763,955, filed on May 13, 2020 and issued as U.S. Pat. No. 11,112,308 on Sep. 7, 2021, which is a U.S. National Stage filing under 35 U.S.C. § 371 of PCT Application No. PCT/US2018/061120, filed Nov. 14, 2018, which claims the benefit under 35 U.S.C. § 119 of the earlier filing date of U.S. Provisional Application No. 62/586,008, filed Nov. 14, 2017, the entire contents of which are hereby incorporated by reference herein in their entirety for any purpose.

STATEMENT REGARDING RESEARCH & DEVELOPMENT

This invention was made with government support under DE-AR0000544 awarded by the Department of Energy. The government has certain rights in the invention.

BACKGROUND

Sensors for measuring and monitoring gas concentrations over large areas are important tools for wide variety of traditional and emerging applications. Many sensor technologies have been deployed for large-area gas concentration measurements and monitoring. Examples include active remote sensing techniques, such as certain forms of light detection and ranging (lidar) and open-path spectroscopy systems, as well as passive remote sensing techniques including imaging spectrometers and optical gas cameras. In addition to remote sensing techniques, distributed point sensor networks and mobile point sensors have been deployed, which may require gas intake for measurements.

Several performance tradeoffs exist between the various types of remote sensors. For instance, passive remote sensors may enable high measurement rates, and therefore may be used to more rapidly cover large areas. However, passive sensors may exhibit low detection reliability, higher false positive rates, and poorer sensitivity compared to their active remote sensor counterparts. For example, state-of-the-art airborne optical gas cameras typically quote methane detection sensitivities in the thousands of ppm-m, and are highly dependent on ambient conditions. Shadows, clouds, and varying background reflectivity from one object or portion of a scene to the next can confound passive remote sensors and make reliable, sensitive detection challenging. Passive sensors may therefore be best suited for detection of the largest leaks. The relatively poor sensitivity of passive measurements may also result in an unacceptably high probability of missed detections—in some cases of relatively large leaks. In contrast, lidar techniques such as wavelength modulation spectroscopy (WMS), differential absorption lidar (DIAL) and tunable diode laser absorption spectroscopy (TDLAS) may achieve methane detection concentration sensitivities of tens of ppm-m or less, which may enable detection of much smaller leaks and during windy, cloudy, or varying background conditions.

In addition to detection sensitivity, lidar sensors may benefit from high spectral selectivity of targeted gas species compared to passive sensors. These properties of lidar measurements may result from the relative consistency of active laser illumination of remote targets and selective detection schemes used to process light signals received by lidar sensors. Selectivity of the target gas species may make lidar sensors especially well-suited for quantification of regions of anomalous gas concentration. Specifically, leak rate quantification of detected plumes may be desirable because it may allow classification and prioritization of detected leaks.

SUMMARY

In at least one aspect, the present disclosure may relate to a method which may include obtaining, using a light detection and ranging (LIDAR) system, a set of gas concentration measurements from a target area. The method may include discarding or modifying certain measurements of the set of gas concentration measurements based on a comparison of measurements in the set of gas concentration measurements to an adaptive threshold with a value based on an expected noise level. The value of the adaptive threshold may vary depending on parameters of the measurement. The method may include determining a presence of an anomalous gas concentration based on the revised set of measurements.

The method may also include determining a confidence that a remainder of the set of gas concentration measurements after discarding or modifying the certain measurements represent anomalous gas concentrations. The expected noise level may be based, at least in part, on a noise model comprising a model of speckle noise in the set of gas concentration measurements. The noise model may also include a detector noise model. The value of the adaptive threshold may be a multiple of the expected noise level. The value of the adaptive threshold may be used to determine a confidence that gas concentration measurements which are above the value represent true positives (e.g., as opposed to false positives). The value of the adaptive threshold may be based, at least in part, on an amount of light received by the LIDAR system.

In at least one aspect, the present disclosure may relate to a method which may include obtaining, using a light detection and ranging (LIDAR) system including a laser source modulated at a modulation frequency, a set of gas concentration measurements from a target area. The method may include discarding or modifying certain measurements of the set of gas concentration measurements based at least in part on a signal amplitude present in at least one odd harmonic of the modulation frequency to provide a revised set of measurements. The method may include determining a presence of an anomalous gas concentration based on the revised set of measurements.

The method may also include measuring an amount of speckle noise in the measurement based on the signal amplitude. The method may also include determining an expected amount of speckle noise based on a speckle noise model, and comparing the measured amount of speckle noise to the expected amount of speckle noise. The method may also include determining a confidence that a remainder of the set of gas concentration measurements after discarding or modifying the certain measurements represent anomalous gas concentrations.

In at least one aspect, the present disclosure may relate to a method which may include obtaining, using a light detection and ranging (LIDAR) system, a set of gas concentration measurements from a target area. The method may include determining, based on a speckle noise model, at least one anomalous gas concentration measurement in the set of gas concentration measurements. The method may include determining a presence of a gas plume associated with the at least one anomalous gas concentration measurement and one or more of the set of gas concentration measurements nearby a location of the at least one anomalous gas concentration measurement.

The method may also include determining a direction, location and/or source of the gas plume. The method may also include determining if each of the at least one anomalous gas concentration measurements is associated with a gas plume, and modifying or discarding certain of the at least one anomalous gas concentration measurements which are not associated with a gas plume. The determining the presence of the gas plume may include integrating along a plurality of lines which are perpendicular to the direction of the gas plume.

In at least one aspect, the present disclosure may relate to an apparatus which may include an optical system, at least one processor, and a memory. The optical system may include a laser source which may be modulated at a modulation frequency. The optical system may record a set of gas concentration measurements based on received light from a target area. The memory may be encoded with executable instructions, which may be executed by the at least one processor. The executable instructions may cause the apparatus to discard or modify certain measurements of the set of gas concentration measurements based on a comparison of measurements in the set of gas concentration measurements to an adaptive threshold to provide a first revised set of measurements. The adaptive threshold may have a value based on an expected noise level. The executable instructions may cause the apparatus to identify certain of the measurements of the first revised set of measurements as outliers and discard or modify the identified outliers to provide a second revised set of measurements. The executable instructions may cause the apparatus to determine a presence of a gas plume based on at least one measurement point in the second revised set of measurements and discard or modify measurements of the second revised set of measurements which are not associated with the gas plume.

The executable instructions may also include instructions to cause the apparatus to determine a detection confidence. The executable instructions may also include instructions to cause the apparatus to determine a first confidence based on the first revised set of measurements, a second confidence based on the second revised set of measurements, and a third confidence based on the gas plume, and wherein the processor may determine the detection confidence based on the first, second, and third confidences. The executable instructions may also include instructions to cause the apparatus to generate a map based on the detection confidence.

The apparatus may also include a mobile platform which may support the optical system and move relative to the target area. The optical system may determine range information between the optical system and surfaces of the target area, and wherein the map is based on the gas plume and the range information.

The executable instructions may also include instructions to cause the apparatus to determine the expected noise level based on a noise model comprising a speckle noise model. The executable instructions may also include instructions to cause the apparatus to identify the outliers based, at least in part, on a signal amplitude present in at least one odd harmonic of the modulation frequency. The executable instructions may also include instructions to cause the apparatus to determine the presence of the gas plume based on an angular dependence of the concentration about the at least one measurement point in the second set of revised measurements.

DETAILED DESCRIPTION

Figure 1:
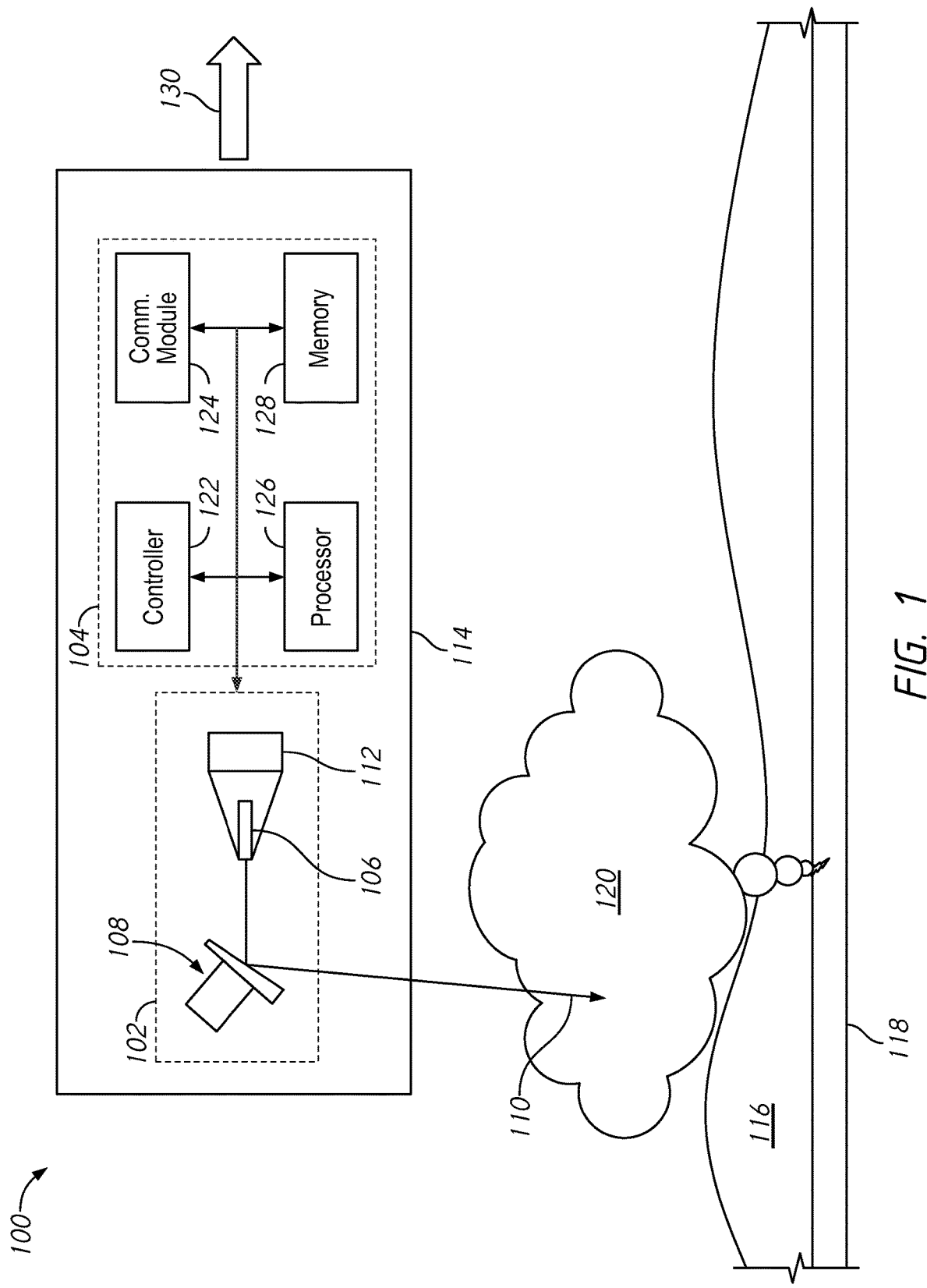
FIG. 1 is a block diagram of a measurement system according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Spectroscopy may be used in a wide array of applications to determine properties of a target based on the interaction of different wavelengths of electromagnetic radiation with the target. An optical system may direct light from a transmitter (e.g., a light source, a telescope, etc.) onto the target, and/or may direct light from the target (e.g., reflected and/or scattered light) onto a receiver (e.g., a camera, a telescope, etc.). Measurements of the received light incident on the receiver may be used to determine one or more properties of the target. In an example application, the target may be a gas, and a concentration of the gas may be calculated based on a measurement of the light received, compared to the light transmitted, or based on any other method. In some embodiments, wavelength modulation spectroscopy may be used, where the concentration of the gas may be calculated based on a measurement of the light received at a given wavelength at a given wavelength modulation frequency compared to the light transmitted at that wavelength.

Spectroscopy may be used to determine if the concentration of a particular gas is anomalous. An anomalous concentration may represent a spatial region where the concentration of a given gas is greater than some background concentration of the gas. For example, the anomalous concentration may represent a leak of an industrial gas (e.g., methane) into a surrounding environment. Detection and/or location of anomalous concentrations of certain gases may be used to determine one or more actions, such as remediating a leak or other problem, monitoring environmental conditions, evacuating an area, or others.

In some scenarios, it may be important to be able to detect relatively low concentrations of the gas. However, spectroscopy measurements may include a contribution from noise. The noise may be due, for example, to physical properties of the system (e.g., detector noise, thermal noise, etc.) and/or properties of the light (e.g., speckle noise). In some cases, the amount of noise may be similar to the level of the measured signals associated with the anomalous gas concentrations. The noise may lead to false positives, where a relatively high amount of noise in a given measurement causes the system to treat that measurement as an anomalous gas concentration, even though there is not one. Since detected anomalous gas concentrations may lead to expensive and/or time-consuming actions (e.g., shutting down a pipe believed to be leaky, or deploying repair crews), it may be desirable to minimize the number of false positives. However, it may also be important to detect relatively low concentrations of the gas (e.g., to have a low limit of detection) so that, for example, even relatively small and/or slow leaks can be detected (e.g., to reduce false negatives). Thus, it may be important to process a set of spectroscopy measurements to determine which measurements represent an anomalous concentration of gas, and which are due to noise.

The present disclosure provides examples of apparatuses and methods for detecting anomalous gas concentrations. After spectroscopy measurements are collected, they may be processed to eliminate (and/or reduce) false positives. A noise model may be used which includes a speckle noise model. For each of the spectroscopy measurements (e.g., for each point of the measurements) the noise model may be used to calculate an expected amount of noise, and an adaptive threshold may be generated based on the expected amount of noise. The adaptive threshold may be set based on the expected amount of noise in individual, separate, grouped, averaged, or any other combination or processed measurement values. In some embodiments, the adaptive threshold may be set based on the expected amount of noise in a given set of measurement data. The adaptive threshold may be used to filter the measurements. The amount or severity of speckle noise in individual or groups of the measurements may also be measured and used to determine if a given measurement is an outlier or not. The adaptive threshold and the amount of speckle noise may be used (alone or together) to filter each of the spectroscopy measurements (e.g., by removing certain points, applying a weight to certain points, etc.).

Additionally, plume detection may be used to further filter the data, since measurement points with anomalous gas concentrations are likely to have neighboring or nearby points with elevated gas concentration. The plume detection may be used on its own, or may be used with the adaptive thresholding and/or speckle measurement. Each of these processing steps may include a calculated confidence, which may represent a probability that a detected anomalous gas concentration is a true positive. The confidence and/or concentrations may be plotted to form a map or other spatial distribution. In some embodiments, the computed confidence may be used to label one or more plumes on a map showing gas concentration.

FIG. 1 is a block diagram of a measurement system according to an embodiment of the present disclosure. The measurement system 100 includes an optical system 102 and a computing system 104. The optical system 102 includes a transmitter 106, which provides emitted light to a scanner 108, which directs an example light ray 110 towards a target area 116. The target area 116 may include a gas source 118 which emits a gas 120. The light ray 110 may interact with the gas 120, and a portion of the light may return to the optical system 102 and be measured by a receiver 112. The computing system 104 includes one or more components such as a controller 122, a communications module 124, a processor 126, and/or a memory 128. All or part of the measurement system 100 may be mounted on a mobile platform 114, which may have a direction of motion 130 relative to a target area 116.

In some embodiments, the measurement system 100 may be a light detection and ranging (lidar) system. The lidar system may use lasers to detect gas 120, as well as optionally performing one or more other measurements (e.g., distance). In some embodiments, the measurement system 100 may be a spectroscopic system (e.g., wavelength modulation spectroscopy) and one or more properties of the gas 120 (e.g., type, composition, concentration, etc.) may be determined based, at least in part, on spectroscopic measurements. In some embodiments, the measurement system 100 may use wavelength modulation spectroscopy (WMS), where a laser used to illuminate the target area 116 is modulated.

The measurement system 100 may take a plurality of spectroscopic measurements, which may be distributed across the target area 116. In some embodiments, the measurement system 100 may be fixed relative to the target area 116. In some embodiments, the measurement system 100 may be mounted on a mobile platform 114, which may move relative to the target area 116. In some embodiments, the measurement system 100 may scan the beam 110 (and/or the field of view of the receiver 112) across the target area 116.

The information gathered by the measurement system 100 may be used to determine one or more properties of the gas 120 such as a concentration of the gas 120. The gas 120 may be an anomalous gas, which may normally be absent from the environment of target area 116 (or may normally be at low or trace amounts in the environment of the target area 116). In some embodiments the gas 120 may be an environmental hazard, such as methane. In some embodiments, the target area 116 may include a wellsite, a pipeline, a pipeline right-of-way, a landfill, a waste water facility, a feedlot, an industrial site, a waste disposal site, or combinations thereof. The measurement system 100 may generate, as an output, a spatial distribution (e.g., a map) of the concentration of the gas 120. The spatial distribution of concentrations of the gas 120 about the target area 116 may be used, for example, to locate a source 118 (e.g., a leak), and/or determine a flow rate of the gas 120. In some embodiments, one or more actions may be taken based on the measurements and/or spatial distribution such as, for example, evacuating an area, measuring an environmental hazard, locating a gas leak (e.g., dispatching one or more personnel to a site indicated by the measurements and/or spatial distribution), determining a possible repair, conducting a repair (e.g. at a location indicated by the measurements and/or spatial distribution), ensuring regulatory compliance, or combinations thereof. Other actions may be taken in other embodiments.

The optical system 102 may provide scanning light and may receive received light from the target area 116. The scanning light may be represented by the light ray 110. The optical system 102 may direct the light ray 110 along a scan path. The transmitter 106 may provide incident light (e.g., transmitted light), which may interact with (e.g., be redirected by) the scanner 108 to provide the scanning light. The scanner 108 may redirect the emitted light towards the target area 116 to become the light ray 110. The scanner 108 may change the angle and/or direction of the light ray 110 over time. In the example embodiment of FIG. 1, the scanner 108 is shown as a rotating angled reflector, however, any scanner may be used. While a scanner 108 is shown in FIG. 1, it should be understood that in some embodiments, the scanner 108 may not be used. In some embodiments, additional components (e.g., lenses, filters, beam splitters, prisms, refractive gratings, etc.) may be provided in the measurement system 100 to redirect and/or change other properties of the light.

The optical system 102 includes a transmitter 106, which may produce transmitted light. A portion of the transmitted light (which, in some embodiments may be substantially all of the transmitted light) may reach the scanner 108 as incident light. In some embodiments, the transmitter 106 may produce a broad spectrum of light across a range of wavelengths. In some embodiments, the transmitter 106 may produce the transmitted light with a particular spectrum (e.g., a narrow bandwidth centered on a selected wavelength). In some embodiments, the transmitter 106 may include a laser, and the transmitted light may generally be coherent. In some embodiments, the controller 122 may cause the spectrum of the transmitted light to change over time. In some embodiments, the wavelength of the transmitted light may be modulated for WMS. In some embodiments, the wavelength of the transmitted light may be modulated for frequency-modulated, continuous-wave (FMCW) LiDAR.

The optical system 102 may also receive light from the target area 116. The received light may be thought of as a bundle of light rays (e.g., light ray 110) which reach the receiver 112. In some embodiments, the received light may be redirected by the scanner 108 onto the receiver 112. The size of the area from which light rays reach the receiver 112, and the amount of light which reaches the receiver 112, may be dependent on the field of view of the scanning system 100. In some embodiments, the transmitter 106 and the receiver 112 may be packaged together into a single unit. In some embodiments, the transmitter 106 and the receiver 112 may be coaxial with each other. In some embodiments, a single transceiver may be used as both the transmitter 106 and the receiver 112 (e.g. monostatic transceiver).

The optical system 102 may optionally be mounted on (e.g., supported by) a mobile platform 114, which may move along a direction of motion 130 relative to the target area 116. In some embodiments, the mobile platform 114 may be an aerial vehicle. The mobile platform may be manned (e.g., an airplane, a helicopter) or unmanned (e.g., a drone). In some embodiments, the unmanned vehicle may operate based on remote instructions from a ground station and/or may operate based on internal logic (e.g., on autopilot).

The motion of the optical system 102 along the direction of motion 128 along with the changing angle of the light ray 110 (and area 'seen' by the receiver 116) due to the scanner 108 may cause the light ray 110 follow a scan path. The scan path may be generally have a repeating shape (e.g., a helical shape). In some embodiments, without the direction of motion 130 of the mobile platform 114, the light ray 110 may follow a closed path, such as a circle or an ellipse. In these embodiments, the motion of the mobile platform 114 may extend the closed path into the scan path.

The light ray 110 may interact with one or more targets, such as gas 120, within the target area 116. In some embodiments, the gas 120 may redirect (e.g., by scattering, reflection, etc.) a portion of the light ray 110 back along an optical path leading to the receiver 112. In some embodiments, the light ray 110 may interact with the gas 120 (e.g., via absorption or dispersion) and then be redirected along an optical path back towards the receiver 112 by one or more other features of the target area 116 (e.g., the ground). In some embodiments, the gas 120 may both redirect the light ray 110 and also modify the scanning light (e.g., may absorb, scatter, transmit, and/or reflect the light ray 110).

A portion of the light ray 110 may return to the receiver 112 as received light after interacting with the gas 120. The receiver 112 may include one or more detectors, which may generate a measurement (e.g., of an intensity, wavelength, phase, and/or other property of the light) based on the received light. The measurements may be provided to the computing system 104. The computing system 104 may generate a gas concentration measurement based on the signal from the receiver 112. As the light ray 110 scans across the target area 116, multiple gas concentration measurements may be generated, which may be spatially distributed across the target area 116. Certain of the measurements may be associated with a region including the gas 120, while other measurements are associated with regions which do not contain the gas 120.

The computing system 104 may determine a presence, location, concentration, flow rate and/or other properties of the gas 120 based on the measurements. The computing system 104 may use one or more aspects (e.g., wavelength, intensity) of the received light to determine one or more properties (e.g., concentration, content, etc.) of the gas 120. In some embodiments, computing system 104 may compare one or more aspects of the emitted light provided by the transmitter 106 to corresponding aspects of the received light. In some embodiments, computing system 104 may direct the controller 122 to modulate the wavelength of the emitted light provided by the transmitter 106, and computing system 104 may determine properties of the gas 120 based on wavelength modulation spectroscopy. The computing system may store one or more pieces of information (e.g., measurements, calculated properties, etc.) in the memory 128 and may send and/or receive information with the communications module 124.

The measurement system 100 may determine regions of the target area 116 with anomalous concentrations of the gas 120. The anomalous concentrations of the gas 120 may represent one or more regions where there is a concentration of the gas 120 which is greater than a background level of the gas 120. The measurement system 100 may use a detection threshold, above which a concentration is judged to be anomalous. Noise in the measurement system 100 may be translated into an equivalent concentration of the gas 120. This noise may cause false positives, where certain gas concentration measurements are judged to be anomalous even if they are not associated with elevated concentrations of the gas 120. One source of noise may be speckle noise, which is caused by interference of coherent light (e.g., laser light). The speckle noise may, at least in part, determine a limit of detection of the measurement system 100.

The computing system 104 may process measurements from the optical system 102. The computing system 104 may apply one or more of a series of processing steps to narrow down the measurements to those which are true positives (e.g., by filtering out noise). The computing system 104 may include a noise model, which may be used to determine expected amounts of noise based on measurement conditions, which may include the amount of light received by the receiver 112. The noise model may, in turn, be at least partially based on a speckle noise model, which may represent the amount of expected speckle noise for a given set of measurement conditions. The noise model may also be at least partially based on a detector noise model. The computing system 104 may use one or more processing steps such as adaptive thresholding, speckle filtering, and/or plume detection, each of which may be based, at least in part, on a noise model including a speckle noise model.

The computing system 104 may store one or more executable instructions, and one or more additional pieces of information (e.g., the noise model) in the memory 128. The processor 126 may use the information in the memory 128 along with measurements from the optical system 102 to determine properties of the gas 120. The processor 126 may operate the controller 122 to control the measurement system 100 (e.g., by operating the transmitter 106). The computing system 104 may be in communication with one or more remote locations via the communications module 124.

In some embodiments, the processor 126 may determine a spatial distribution of the concentration of the target gas 120. The concentration of the gas 120 may be determined based on individual measurements which may be swept along the scan path. The processor 126 may measure a spatial location of a given measurement (e.g., based on mapping of the target area 116) and/or may determine the spatial location based on known location parameters (e.g., based on known properties of the direction of motion 130 and/or scan path of the light beam 110). In some embodiments, the measurement system 100 may include a location determination system (e.g., a GPS, an inertial navigation system, a range-finding system, etc.) to aid in determining the spatial distribution. The individual measurements may then be combined with the spatial information to generate the spatial distribution. The spatial information may be 2D and/or 3D. While a single processor 126 and memory 128 are shown in FIG. 1, in other examples multiple processor(s) and/or memories may be used—e.g., the processing and storage described herein may be distributed in some examples.

The measurements and/or information derived from the measurements (e.g., a spatial distribution of the measurement) along with other information (e.g., an altitude of the mobile platform 114, a rate of movement of the scanner 108, etc.) may be provided to the memory 128 and/or communications module 124. The memory 128 may be used to record information and/or store instructions which may be executed by the processor 126 and/or controller 122 to perform the measurements. The communications module 124 may be a wireless communication module (e.g., radio, Bluetooth, Wi-Fi, etc.) which may be used to transmit information to one or more remote stations and/or to receive instructions from the remote stations.

In some embodiments, where a mobile platform 114 is used, one or more components of the measurement system 100 may be located off of the mobile platform 114. For example, components of the computing system 104 such as the memory 128 and/or the processor 126 may be located at a remote station (e.g., a ground station) and may receive information/instructions from and/or provide information/instructions to the optical system 102 via the communications module 124. Different arrangements or parts of the measurement system 100 between the mobile platform 114 and one or more remote stations are possible in other examples. Although not shown in FIG. 1, in some embodiments one or more additional components may be provided in the measurement system 100 (either in the mobile platform 114 or at a remote location communicatively coupled to the other components) such as a user interface, display, etc.

Figure 2:
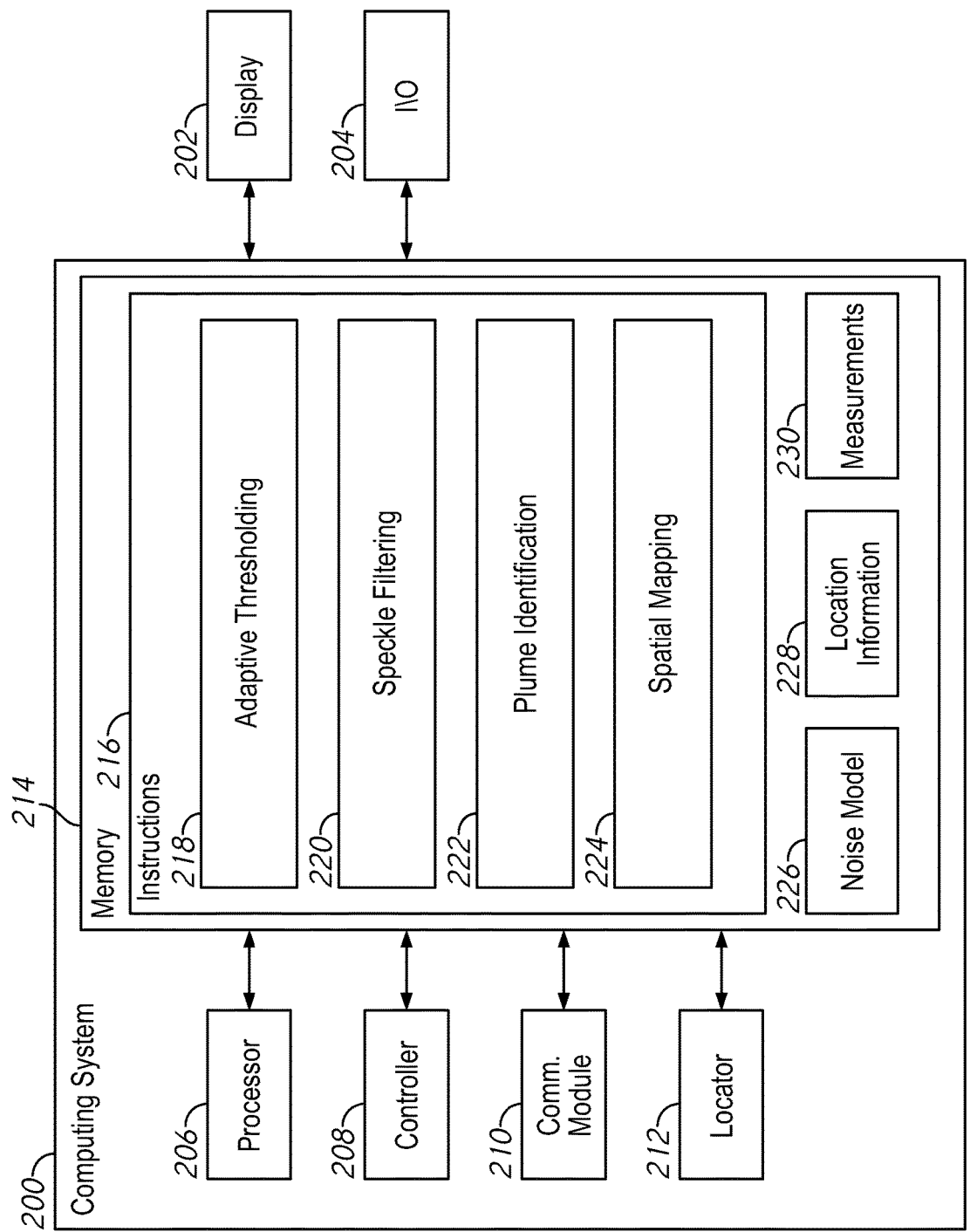
FIG. 2 is a block diagram of a computing system according to an embodiment of the present disclosure.

FIG. 2 is a block diagram of a computing system according to an embodiment of the present disclosure. In some embodiments, the computing system 200 may be used to implement the computing system 104 of FIG. 1. The computing system 200 includes one or more processors 206, a controller 208, a communications module 210 and a locator 212 all coupled to a memory 214. The memory 214 includes instructions 216 which may include particular sets of instructions such as block 218 which includes instructions for adaptive thresholding, block 220 which includes instructions for speckle rejection; block 222 which includes instructions for plume identification, and block 224 which includes instructions for spatial mapping. The memory 214 may include one or more other components which may be accessed by one or more of the instructions 216, such as a noise model 226, location information 228, and/or additional measurements 230. The computing system 200 may be coupled to additional components such as a display 202 and an input/output (I/O) device 204 (e.g., keyboard, mouse, touchscreen, etc.).

While certain blocks and components are shown in the example computing system 200, it should be understood that different arrangements with more, less, or different components may be used in other embodiments of the present disclosure. For example, while a single processor block 206 is shown in the computing system 200, multiple processors may be used. In some embodiments, different processors may be associated with different processes of the computing system 200, such as with different instructions 216 in the memory 214, or with different functions (e.g., a graphics processor). While the example computing system 200 is shown as a single block, it should be understood that the computing system 200 may be spread across multiple computers. For example, a first computer may be located near the optical system (e.g., a computer on mobile platform 114 of FIG. 1), while a second computer may be at a remote location. The various components of a computing system 200 may be coupled by any combination of wired and/or wireless connections (e.g., cables, wires, Wi-Fi, Bluetooth, etc.).

The processor 206 may access the memory 214 to execute one or more instructions 216. Based on the instructions 216, the processor 206 may process measurements from an optical system (e.g., optical system 102 of FIG. 1). The processor 206 may receive measurements "live" from the optical system as the measurements are generated (e.g., measurements may be streamed, provided real-time, or otherwise dynamically transferred), and/or may retrieve measurements 230 which were previously stored in the memory 214. In some examples, the instructions 216 may cause the processor 206 to process the measurements by filtering the measurements, adjusting the measurements, generating new data based on the measurements, and/or storing the measurements in the memory 214.

The instructions 216 may include block 218, which includes instructions for adaptive thresholding. The processor 206 may determine a threshold based on a noise model 226. The noise model may be analytical, empirical, or a combination thereof. The noise model may receive, as an input, a parameter of a measurement (e.g., a measured amount of light received by the receiver) which may vary, for example, from one measurement to the next or from one measurement set to the next. As a result, the noise model may generate an expected noise level (e.g., for each measurement, or for any combination of measurements), and the processor may consequently determine a threshold, that may vary from one measurement to the next or from one measurement set to the next (e.g., adaptive). If a given measurement is above the threshold, then the measurement may be considered to be anomalously high and identified for consideration as a true positive. The noise model 226 may include a speckle noise model. The noise model 226 may generally include inputs (e.g., the measured amount of light received by the receiver) which may be used to computationally describe the contributions of and/or behavior of detector noise and/or speckle noise. The noise model 226 may be used to adjust a value of the threshold based on the expected amount of noise (including speckle noise) for that measurement. The noise model 226 may use one or more parameters used to collect the measurements (e.g., scan rate, beam size/shape, etc.) to determine the expected amount of noise. In some embodiments, each of the measurements in a set of measurements may be compared to the same threshold value. In some embodiments, there may be multiple different threshold values (e.g., a different threshold for one or more individual measurements in the set of measurements) applied to a set of measurements. The threshold value may be adaptively determined at least in part for a given measurement (or group of measurements) based on measurement parameters (e.g. the amount of light measured by the transceiver) of that measurement or based on measurement parameters of a set of measurements. Measurements which are above the adaptive threshold may be identified for consideration as anomalous gas concentration measurements. In some embodiments, measurements which are below the adaptive threshold for that measurement may be discarded or otherwise modified (e.g., weighted). In some embodiments, measurements which are above the threshold may be modified (e.g., weighted).

Since the adaptive threshold is based on a noise model, a statistical level of certainty that a given measurement is an anomalous measurement may be calculated. For example, at least because a computational noise model is used in examples of adaptive thresholding described herein, a level of certainly may be associated with the computation. Thus, for a given adaptive threshold, the anomalous measurement may have some chance of being a true positive (e.g., of representing an actual anomalous gas concentration rather than noise). In some embodiments, the confidence from the adaptive filter may be stored in the memory 214 along with the concentration associated with that measurement. In some embodiments, the level of confidence in the adaptive filter may be the same for each of measurements. In some embodiments, the level of confidence in the adaptive filter may be different between one or more of the measurements. In some embodiments, the level of confidence in the adaptive filter may be user selectable.

Instructions 216 also include block 220, which includes instructions for speckle filtering. The speckle filter may be used to determine if an identified anomalous measurement (e.g., identified based on the adaptive threshold of block 218) is an outlier. The speckle noise model (and therefore the overall noise model 226) may be based on certain assumptions about statistical properties of the speckle noise (e.g., a distribution of the speckle noise, a source of the speckle noise, etc.). The amount of speckle noise in each gas concentration measurement may be measured, and this may be used to identify certain measurements (e.g., measurements which do not meet the assumptions of the model). These measurements may be identified, weighted, or rejected as contaminated by speckle noise, and therefore likely to be outliers.

The speckle filtering may generate a measurement of the amount of speckle noise in a given measurement. The measured amount of speckle noise may be compared to the expected amount of noise from the noise model 226. If the measured amount of noise for a given measurement exceeds a threshold based on the expected amount of noise for that measurement, the measurement may be considered an outlier. Outlier measurements may be discarded or modified (e.g., weighted). Measurements which are not outliers may be retained. In some embodiments, measurements which are not outliers may be modified (e.g., by weighting).

The computing system 200 may also determine a confidence based on the speckle filter. The outlier threshold may be based on the noise model 226, and therefor may reflect a statistical probability. Thus, measurements which are retained by the speckle filter may have a certain confidence or probability of representing an anomalous gas measurement rather than noise.

The instructions 216 also include block 222, which includes instructions for plume identification. The plume identification may further filter anomalous gas measurements (e.g., as determined by blocks 218 and/or 220) and may increase a confidence that a given anomalous gas measurement represents a true positive. The plume identification may be based on the idea that since the gas will tend to diffuse and/or be blown by wind away from a source of the gas, an anomalous gas concentration measurement which represents an anomalous gas concentration should have neighboring or nearby measurements which also have elevated concentrations of gas. The block 222 may include instructions for one or more techniques which may measure a spatial distribution of gas measurements about a suspected source. The plume detection may treat previously identified anomalous gas concentration measurements (e.g., from blocks 218 and/or 220) as suspected sources. In some embodiments, measurements may be determined to be part of a plume based, at least in part, on the noise model 226. The plume identification may also include a plume filter, which may discard and/or modify measurements which are not associated with a plume. The plume detection may also determine a shape and/or direction of the gas plume. As with blocks 218 and 220, the plume identification of block 222 may also generate a confidence. The confidence may represent a probability that a given plume represents a true positive.

In some embodiments, all three of blocks 218, 220, and 222 (e.g., adaptive thresholding, speckle filtering, and plume identification) may be used together to determine the location of anomalous gas concentrations and their associated plumes. A set of measurements may be provided by an optical system and/or may be retrieved from the measurements 230 stored in the memory. The processor 206 may execute the instructions in block 218 to apply an adaptive threshold to the set of measurements and discard (and/or modify) measurements of the set of measurements which fall below the adaptive threshold. This may provide a first revised set of measurements. The processor 206 may then execute the instructions of block 220 to perform speckle filtering on the first set of revised measurements. An amount of noise in the measurements may be measured and used to determine if the measurement is an outlier. Those measurements which are outliers may be discarded (or modified). The measurements which are not determined to be outliers (e.g., the measurements which are not discarded) may comprise a second set of revised measurements. The processor 206 may execute the instructions in block 222 to perform plume identification on the second set of revised measurements. Each of the remaining measurements in the second set of revised measurements may be investigated to determine if it has an associated plume (additional information such as a direction of the plume may also be determined).

Each of the instructions associated with blocks 218-222 may also provide a confidence that the measurements which are not discarded (or otherwise modified) represent true positives. The computing system 200 may calculate an overall confidence based on the adaptive threshold confidence, the speckle filter confidence, and the plume confidence. A measurement deemed as a true positive may be labeled with such a confidence.

The instructions 216 may also include block 224, which may be executed by the processor 206 to generate spatial mapping. As described in more detail in FIG. 3, block 224 may direct the processor 206 to generate a map of the spatial distribution of the anomalous measurements. In some embodiments, one or more maps may be generated based on the measurement set after being filtered by one or more of the instructions in box 218-222. In some embodiments, the map may be generated with a spatial distribution of the confidence that the measurement at each point represents an anomalous gas concentration. In some embodiments, a map showing spatial distribution of gas concentration may be generated and a confidence may be provided for one or more identified plumes. In some embodiments, block 224 may use additional information, such as location information 228, which may represent a location at which each associated measurement was made. The location information 228 may be provided by a locator 212, which may be a system capable of determining a location over time of the measurements (e.g., a GPS). In some embodiments, measurement system may measure one or more spatial properties of the target area. For example, the measurement system may be able to measure a range to a surface in the target area. The collected range information as the measurement system scans the target area may be used, for example, to generate a topographical map of the target area.

The computing system 200 may also be coupled to be one or more external components, such as a display 202 and an input/output device (I/O) 204. In some embodiments, the display 202 may be used to display one or more pieces of information, such as a map of the concentration measurements (and/or a map of the confidence in those measurements). In some embodiments, the I/O 204 may allow a user to control one or more operations of the computing system 200. For example, the user may be able to select data in a specific area and apply one or more of the filters in blocks 218-222 to it.

Figure 3:
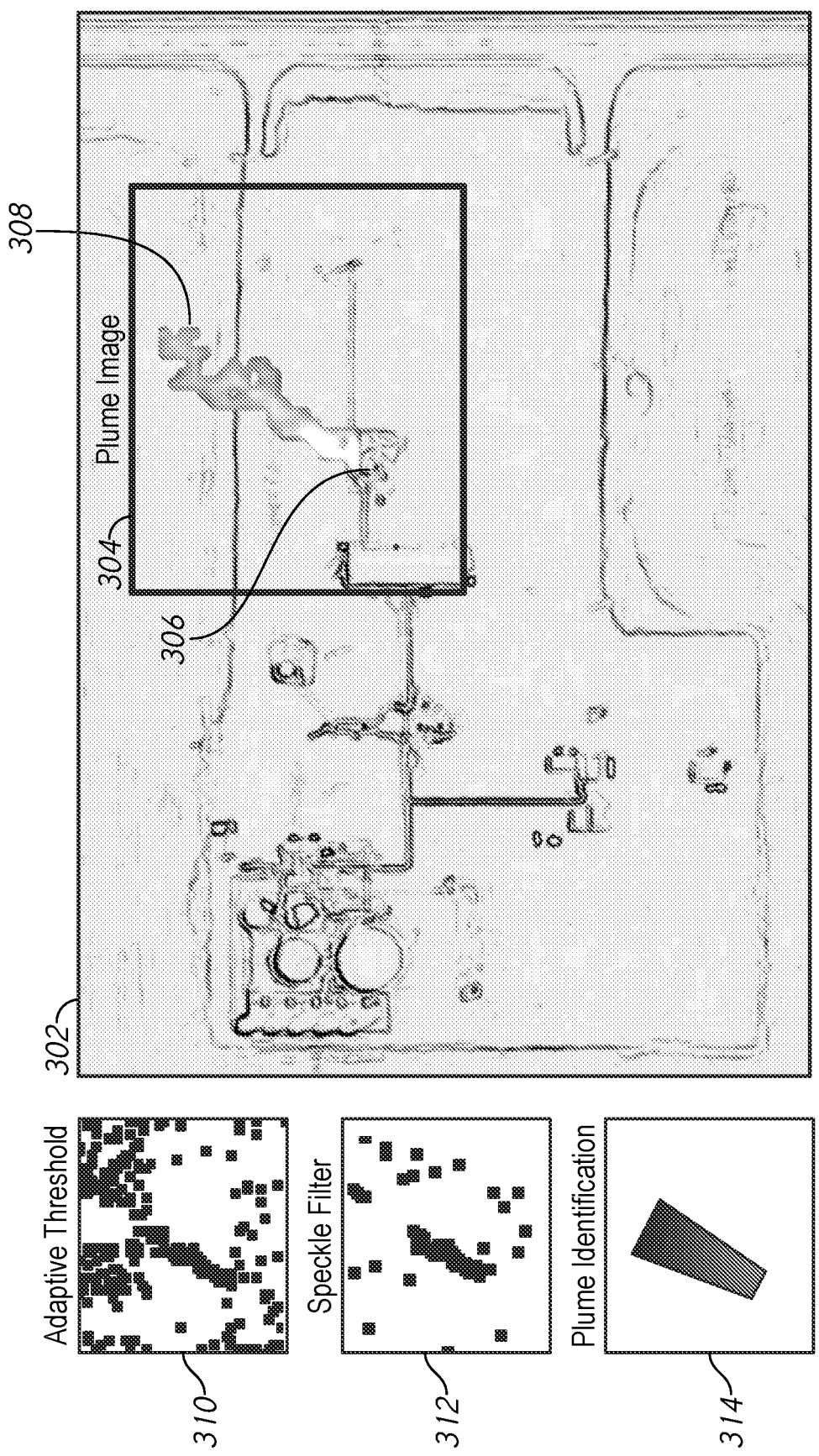
FIG. 3 is an example image of plume detection according to an embodiment of the present disclosure.

FIG. 3 is an example image of plume detection according to an embodiment of the present disclosure. The example image may represent example measurements which may be collected and/or processed by the measurement system 100 of FIG. 1 and/or the computing system 200 of FIG. 2 in some embodiments. The image includes a map 302 representing a target area. A region 304 of the map 302 has been highlighted. The region 304 contains an identified gas plume 308 which is coming from a gas source 306. Each of the boxes 310, 312, and 314 is a graphical representation of a different processing step being applied to measurements within the region 304. As shown in the example of FIG. 3, the boxes 310-314 represent successive filtering steps. The box 310 represents a data mask based on an adaptive threshold, the box 312 represents a data mask based on a speckle filter, and the box 314 represents a data mask based on plume identification. The image of the plume 308 on the map 302 represents measurements which have been processed by each of the filtering steps represented in the boxes 310-314.

The map 302 represents a target area (e.g., target area 116 of FIG. 1). In the example of FIG. 3, the target area is a wellsite, and the gas which is being measured is methane. The map 302 may represent an aerial view of the target area (e.g., as seen from the mobile platform 114 of FIG. 1). The map 302 may be based on a pre-existing map of the target area and/or may be generated by the measurement system (e.g., by a locator 212 of FIG. 2). In some embodiments, the measurement system may use the lidar to measure a distance to a surface (e.g., the ground, a tree, a structure, etc.) of the target area to generate the map 302. In some embodiments, these distance or range measurements may be used to determine elevations of the surfaces of the target area, and may be used to generate a 3D dataset representing the topology of the target area. The example map 302 of FIG. 3 is a 2D representation of a 3D dataset that mapped elevations of surfaces of the target area. In some embodiments, the map may include aerial photography. In some embodiments, the map may include satellite imagery. In some embodiments, the measurement system may map the target area at the same time that gas concentration measurements are being collected. In some embodiments, the same optical system may both map and measure gas concentrations in the target area.

The map 302 includes a region 304, which has been selected for illustrative purposes. The region 304 has been selected because it includes a region of the map 302 which represents a portion of the target area which includes a gas source 306 emitting the gas plume 308. In the map 302, the gas plume 308 may be represented as a color map (or heat map). In the example of FIG. 3 brighter colors within the plume indicate higher gas concentrations. The color map of the gas concentration measurements (including the gas plume 308) may be overlaid on top of the map 302. Before the gas concentration measurements are overlaid on the map 302, they may be filtered so that only anomalous gas concentrations are overlaid on the map 302.

Each of the boxes 310-314 represents one of the filtering steps used to generate the heat map of the gas plume 308 which is overlaid on the map 302. In general, each of the boxes 310-314 shows a data mask which is applied to the gas concentration measurements in the region 304. Each pixel in the first two boxes 310 and 312 may represent an individual measurement point recorded within the region 304. Dark areas (e.g., black pixels) in the boxes 310-312 represent measurements which are retained. White areas (e.g., white pixels) in the boxes 310-312 represent measurements which are discarded. The white area of box 314 also represents measurements which are discarded (as not part of the plume), while the shaded in region represents a plume. The shading in box 314 represents concentration of gas in the plume with lighter shades indicating higher concentration.

The box 310 represents a data mask associated with adaptive thresholding. Each of the measurements (e.g., each of the pixels in the box 310) may be compared to an adaptive threshold calculated based on an expected amount of noise associated with that measurement. The expected amount of noise may be calculated based on a noise model, which may include a speckle noise model. The noise may be expressed as an equivalent concentration measurement based on the noise. If the measurement is greater than an adaptive threshold it may be retained (e.g., the pixel will be black), while if the measurement is below the adaptive threshold it may be discarded (e.g., the pixel may be white).

The box 312 represents a speckle filter which is applied to the data after the data mask in box 310 is applied. The speckle filter may measure an amount of speckle noise in each of the measurements that were retained after box 310. The speckle filter may filter the measurements based on the amount of measured speckle noise. Similar to box 310, a mask may be applied and measurements associated with the dark pixels may be retained.

Box 314 represents plume detection. The plume detection may filter based on groups of individual measurements. The plume detection may be applied to the measurements which are retained in box 312. The plume detection shown in box 314 represents both a source (at the bottom left of the shaded region) and a direction of the plume as the concentration gradient decreases towards the upper right of the box 314. The concentration information and region of the plume in box 314 may be combined with the retained measurements in box 312 to achieve the heat map of the plume 308 which is overlaid on the map 302.

Figure 4:
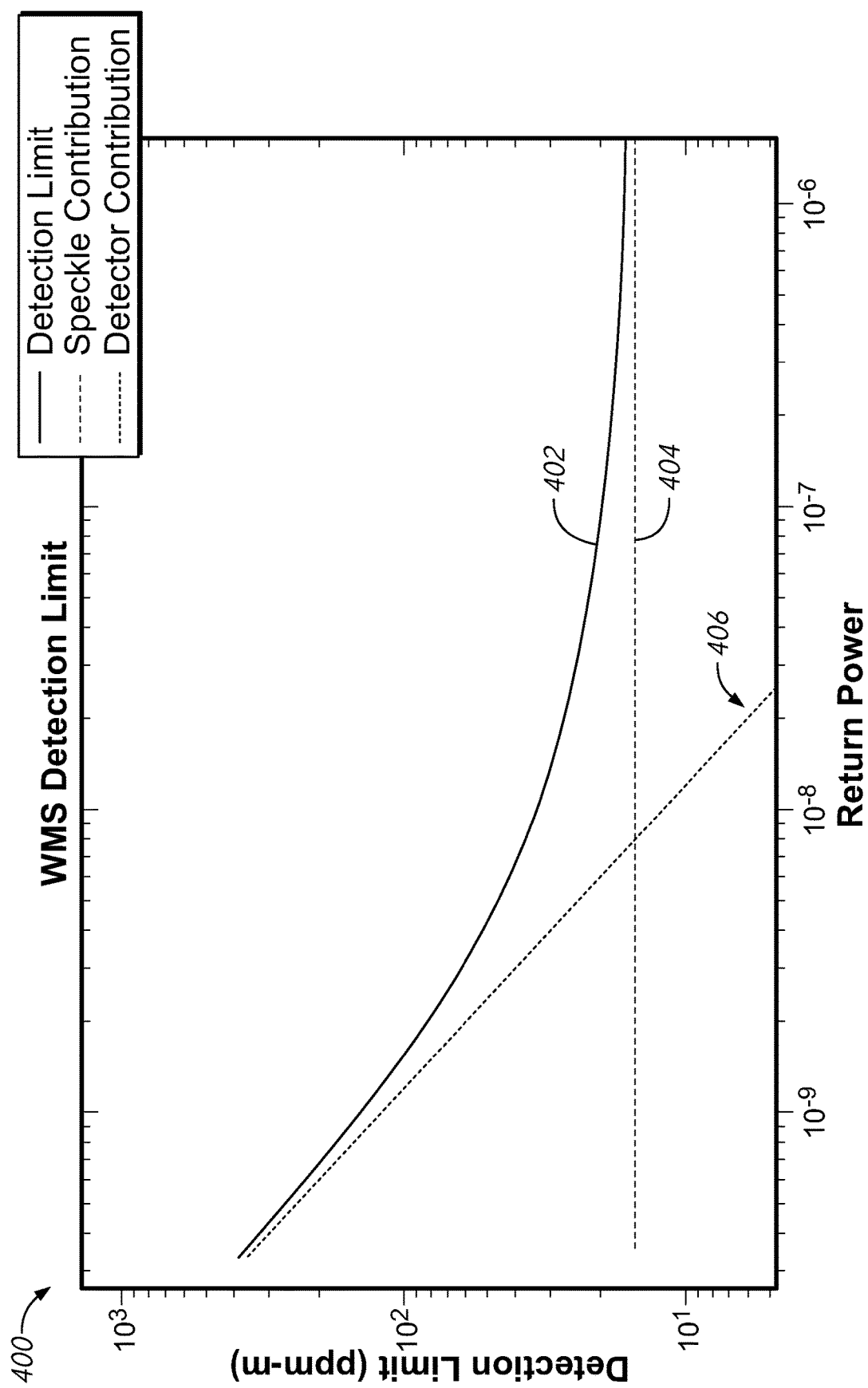
FIG. 4 is a graph depicting a detection limit according to an embodiment of the present disclosure.

FIG. 4 is a graph depicting a detection limit according to an embodiment of the present disclosure. The graph 400 may represent the behavior of a noise model which, in some embodiments, may be used for determining an adaptive threshold (e.g., may be used to implement block 218 of FIG. 2). The x-axis of the graph represents the optical power received by the receiver (e.g., receiver 112 of FIG. 1) and is a log scale. The y-axis represents the detection limit (e.g., a lowest concentration of gas which is detectable over the noise) and is also a log scale. The line 404 represents a detection limit determined solely by speckle noise. Since the detection limit from speckle noise is based on a physical property of the light (its coherence), it may be relatively constant with received optical power. The line 406 represents a detection limit determined solely by a detector (e.g., thermal noise in the electronics). As the amount of received power decreases, the contribution of the detector noise to the lower detection limit may become more significant.

The graph 400 may be based on a noise model which includes terms representing the noise from the detector (e.g., line 406) and a speckle noise model (e.g., line 404). The noise from the detector may be expressed as noise equivalent power (NEP). The speckle noise may be represented by the speckle interference carrier-to-noise ratio ($CNR_{speckle}$). The noise model may provide an expression for the path-integrated gas concentration noise ($C_{noise}$). The noise model may be expressed by equation 1, below:

$$C_{noise} = \frac{1}{2\gamma}\sqrt{\left(\frac{NEP}{P_R\sqrt{T_m}}\right)^2 + \left(\frac{\rho}{CNR_{speckle}}\right)^2} \quad \text{Eqn. 1}$$

In equation 1, $\gamma$ is a coefficient that relates the lidar signal to the concentration of the target gas species, $P_R$ is the light power received by the lidar system and $\rho$ is a coefficient for the coupling strength of speckle interference to the lidar measurement as a function of the target range extent. The noise model may be expressed by equation 2, below:

$$CNR_{speckle} = \sqrt{N_{ave}} = \sqrt{N_{TxRx}M_{scan}} = \sqrt{\left(1 + \left(\frac{\sqrt{2\ln 2}\, D_{rec}\theta_{trans}}{\lambda}\right)^2\right)\left(1 + \frac{\omega_{scan}T_m}{\theta_{trans}}\right)} \quad \text{Eqn. 2}$$

In equation 2, $N_{avg}$ is the total number of speckle cells averaged per measurement. $N_{TxRx}$ represents the number of speckle cells averaged per measurement due to the geometry of the beam illuminating the remote target and the imaging properties of the lidar receiver. Here, $D_{rec}$ is the diameter of the lidar receiver, $\theta_{trans}$ is the half-angle Gaussian divergence of the transmitted beam and $\lambda$ is the wavelength of the transmitted beam. $M_{scan}$ is a multiplicative factor for the number of additional speckle cells averaged per measurement due to spatial scanning of the lidar beam. In this term, $\omega_{scan}$ is the angular speed at which the lidar beam is scanned across the remote target and $T_m$ is the measurement duration.

The line 402 represents a 1$\sigma$ path-integrated detection confidence limit for a WMS lidar system detecting methane at a wavelength of 1650 nm. The 1$\sigma$ confidence limit may represent a statistically expected amount of noise in the measurement based on $C_{noise}$. The line 404 represents the term of Equation 1 which includes the speckle noise model $CNR_{speckle}$ while the line 406 represents the term including the detector noise NEP in this scenario.

Each measurement in a set of measurements may be compared to an adaptive threshold may be based on the expected amount of noise. In some embodiments, the threshold may be based on a multiplicative factor n of the 1$\sigma$ confidence limit. The 1$\sigma$ confidence limit may represent a statistical variable which quantifies detection confidence. When a threshold is chosen that is a multiple n of the 1$\sigma$, there may a probability (e.g., a confidence) p that a given measurement is a false positive. The confidence may be given by the Gauss error function erf according to equation 3, below:

$$p = \text{erf}\left(\frac{n}{\sqrt{2}}\right) \quad \text{Eqn. 3}$$

Equations 1-3 may be based on certain statistical assumptions about the properties of the measurement signals and the noise. In particular, Equation 2 may assume a measurement scenario where the target surface area illuminated by the lidar beam has approximately uniform reflectivity and a random distribution of surface roughness within each speckle cell. These assumptions may be valid for a some measurement conditions. However, certain measurements within a set of measurements (e.g., all the measurements of a target area) may not conform to these assumptions. For example, within a given measurement area, there may be a particular area of strong scattering (and/or reflection), and thus there is not uniform reflectivity. This may lower the effective number of speckle cells averaged in the measurement due to the non-uniform spatial distribution of received signals (e.g., more signals will come from the strong scattering region). In another example, there may be a first semi-transparent (and/or partially blocking) first surface a uniform distance in front of a second surface. The effective number of speckle cells averaged in this measurement scenario may be significantly reduced due to presence of multiple reflective surfaces corresponding to each speckle cell, and the high degree of uniformity in the separation between these surfaces across the illuminated areas and on each surface.

The presence of measurements in gas concentration lidar data sets corresponding to targets with a small number of speckle cells, or other factors, may lead to non-Gaussian behavior in the measurement statistics and/or result in CNR measurements that do not follow or are not well approximated by Equation 2. Specifically, such data sets may contain outlier measurement noise events with frequency of occurrence that exceeds the number expected according to Gaussian statistics and/or based on Equation 2. Such outlier noise events may be misinterpreted as anomalous gas concentration measurements. Such non-Gaussian measurement statistics may therefore lead to higher occurrence of false positives, lower confidence of detection events, and/or poorer sensitivity lidar gas concentration measurements.

Figure 5:
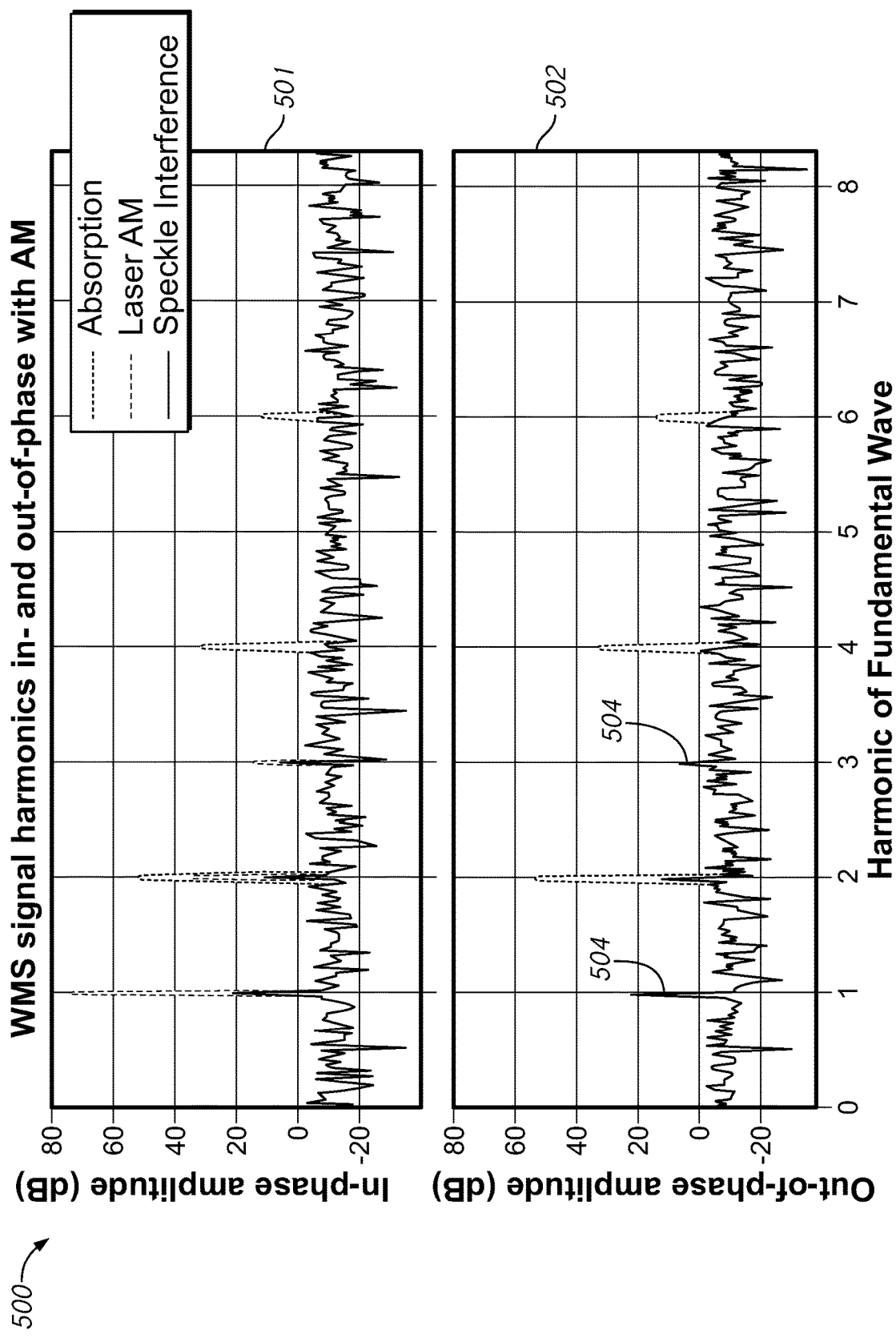
FIG. 5 is a graph of in-phase and out-of-phase harmonics according to an embodiment of the present disclosure.

The outlier noise events may be identified by using a speckle filter (e.g., as in block 220 of FIG. 2) to measure the contribution of speckle noise to a given measurement. In an example system where WMS is used, the amount of measured speckle noise may be quantified based on analysis of harmonics of the frequency at which the emitted laser beam is modulated. FIG. 5 is an example illustration of such a scenario.

FIG. 5 is a graph of in-phase and out-of-phase harmonics according to an embodiment of the present disclosure. Herein, "out-of-phase" may refer to an orthogonal component relative to an "in-phase" component. The graph 500 represents an example of how harmonics of the amplitude modulation may be used to measure an amount of speckle noise in a given measurement. The graph 500 has two parts, graph 501 which shows in-phase amplitude, and graph 502, which shows out-of-phase amplitude. The x-axis of both graphs 501 and 502 is the harmonic of the fundamental modulation wave. The y-axis is the amplitude in decibels (dB).

During WMS, the laser may be modulated with a certain frequency. As may be seen from the received signals in the in-phase graph 501, the laser signal contributes to peaks at each of the in-phase harmonics. The signal from the laser may diminish with each successive harmonic, and may become negligible after a certain harmonic. The laser may have no (or minimal) contribution to peaks in the out-of-phase graph 502.

The absorption of the gas may contribute to peaks in both the in-phase graph 501 and out-of-phase graph at even harmonics. The contribution of the gas absorption may be used to determine the concentration of the gas. The signal from the gas may also diminish with each successive peak (e.g., with each odd harmonic), and may become negligible at a certain point.

Speckle interference due to the coherence of the laser light may contribute to peaks at each of the harmonics in both the in-phase graph 501 and the out-of-phase graph 502. Like the other signals, the signals due to speckle interference may decrease with each harmonic and may become negligible after a certain point. For the out-of-phase graph 502, the odd harmonic peaks 504 may be entirely (or primarily) based on the speckle noise. Thus, the out-of-phase odd harmonic peaks 504 may be used to measure an amount of speckle noise in a given measurement.

The ratio of the in-phase first and second harmonic amplitudes may be related to the gas concentration by equation 4, below:

$$C = \frac{mA_{2f}}{2\gamma A_{1f}} \qquad \text{Eqn. 4}$$

where $A_{2f}$ and $A_{1f}$ are the in-phase first and second harmonic amplitudes, m is the laser intensity modulation depth and $\gamma$ is a coefficient that relates the harmonic amplitude ratio to gas concentration. The contribution of speckle noise may distort the gas concentration measurement in the second harmonic. The distortion to the second harmonic $p_{2f}$ may be modeled as a combination of the distortion to the first harmonic $p_{1f}$ and the distortion to the third harmonic $p_{3f}$ along with a pair of best fit coefficients a and b, as shown in equation 5 below:

$$p_{2f} = ap_{1f} + bp_{3f} \qquad \text{Eqn. 5}$$

The best fit coefficients derived from the distortion of the in-phase harmonics may be used with out-of-phase harmonics to estimate a measurement of speckle interference contribution to the gas concentration Csi. This may involve the out-of-phase first and third amplitudes $Aout_{1f}$ and $Aout_{3f}$, respectively. The measurement of speckle interference noise Csi may be given by combining equations 4 and 5 to yield equation 6, below:

$$C_{si} = \frac{m(aAout_{1f} + bAout_{3f})}{2\gamma A_{1f}} \qquad \text{Eqn. 6}$$

The speckle contribution Csi may be used to process the measurements. For example Csi could be compared to the expected noise Cnoise given by equation 1. In particular, a filter could be used which is based on the outcome of the comparison $C_{si} \geq MC_{noise}$, where M is a multiplicative factor applied to the expected measurement noise level $C_{noise}$. If $C_{si}$ exceeds $MC_{noise}$ the measurement may be identified as containing an excessive contribution from speckle interference and may be excluded from the data set, given a modified confidence rating or scrutinized using additional information or metrics. Other methodologies for determining a relative contribution of speckle noise may also be used.

In this manner, the measured amount of speckle noise in a measurement may be used to determine if the measurement may be an outlier. The measured amount of noise may be compared to a multiple of the expected amount of noise, and the measurement may be rejected (or weighted or otherwise modified) if the measured amount of noise exceeds the a threshold, which may be based on a multiplicative factor times the expected amount of noise. In this manner, measurements which are outliers (e.g., because they violate assumptions of the noise model) may be filtered out of the data set.

Figure 6:
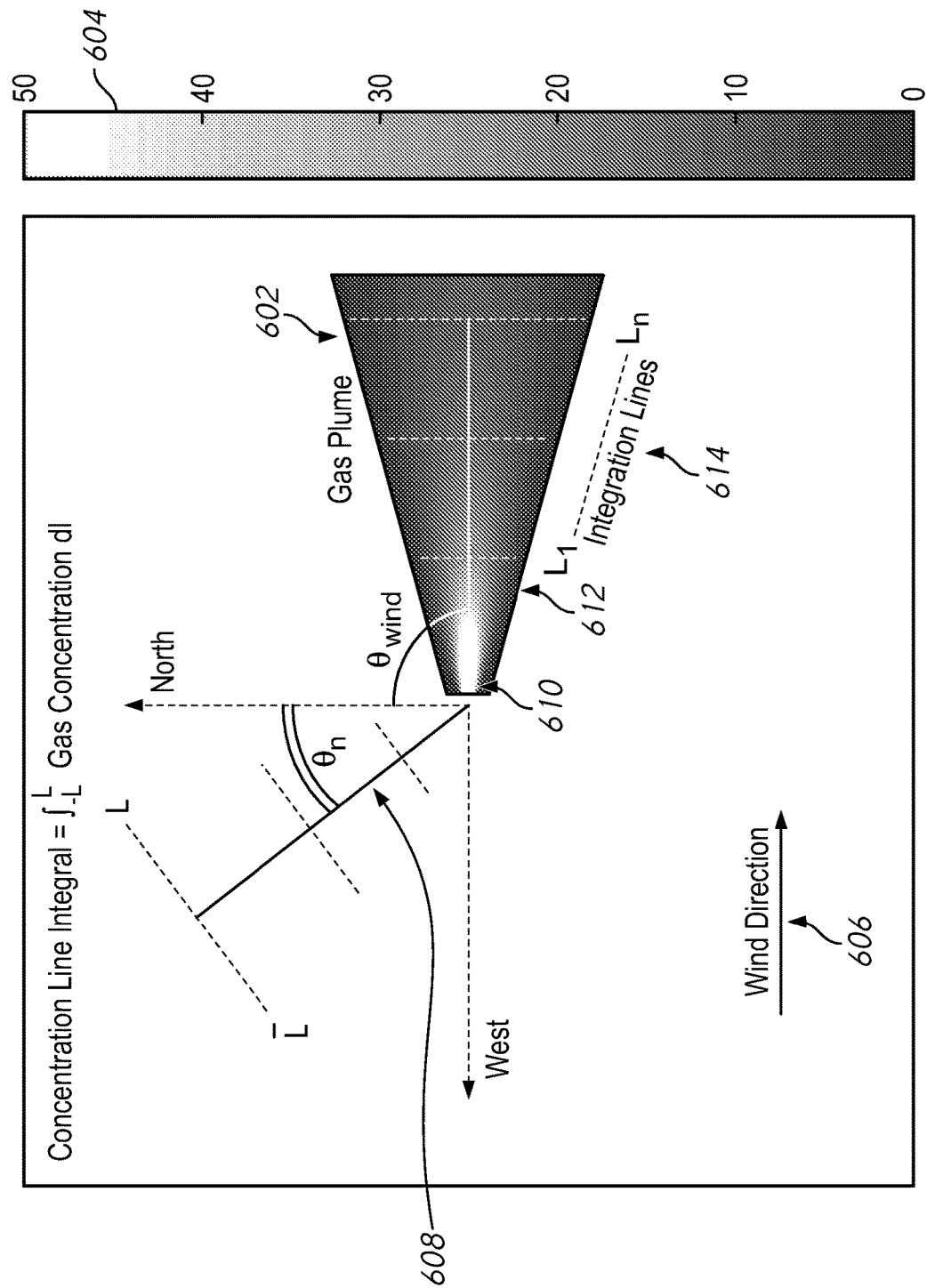
FIG. 6 is a schematic diagram depicting gas plume detection according to an embodiment of the present disclosure.

FIG. 6 is a schematic diagram depicting gas plume detection according to an embodiment of the present disclosure. The gas plume detection represented in FIG. 6 may illustrate principals which may be used to implement the gas plume identification 222 of FIG. 2, in some embodiments. The gas plume 602 is represented on an x-y axis which represent the cardinal map directions, and by a color scale 604 which represents a concentration of the gas at a given point in space. The gas plume 602 is emitted from a source 610, and is caused by a wind direction 606 to elongate in the 'downwind' direction (in this example, due east).

One example method of plume detection may involve computations to determine the quantity of gas near a suspected emission source 610 as a function of direction from the suspected emission source 610. The plume direction may use a given measurement as a suspected source of the plume. The measurement used as the suspected source may be one of the anomalous gas concentration measurements identified by adaptive thresholding and/or speckle filtering. In some embodiments, different potential sources of the plume may be investigated in an iterative manner. Computations for determining the gas quantity versus direction from the suspected emission point may generally involve measuring a concentration corresponding to a particular direction (e.g., due East as shown in the graph 600). The direction of measurement may then be rotated to a new direction (e.g., along direction 608). By performing such concentration measurements in multiple directions, the direction of highest concentration may be determined and may correspond to a plume direction.

In one embodiment, and example method of calculating concentration corresponding to a direction may involve taking particular line integrals along numerous integration lines 614 (indicated by $L_1$ through $L_n$) at different distances from the suspected emission source 610, or computing an average gas concentration within an area 612 relative to the suspected emission source 610.

If line integrals are used there may be many possible definitions for computing a gas concentration line integral $CI_n$ along the $n^{th}$ integration line 614. In one example, the line integral may be given by equation 7, below:

$$CI_n = \int_{-L_n}^{L_n} C dl \approx \sum_{n=1}^{N} C_n \Delta l \qquad \text{Eqn. 7}$$

where C represents the gas concentration map, $C_n$ is the set of concentration measurements along the integration line and $\Delta l$ is the separation between the gas concentration measurements along the integration line. The gas concentration line integrals or average gas concentration computations may be performed corresponding to additional radial directions at different angles, one of which is represented by 608, relative to the source 610. The results of the gas concentration computations (e.g., with equation 7) corresponding to multiple directions may be combined to produce a graph representing the gas concentration as a function of direction. The angle corresponding to the highest gas concentration may indicate the direction of the plume.

The integration lines 614 or area shape 612 may be oriented perpendicular to a line extending radially from suspected emission source 610, and the length of the lines 614 or width of the shape 612 may depend on the radial distance from source 610. In other example embodiments, the integration lines may be oriented at angles other than perpendicular. Although the integration lines 614 are shown as straight in the example of FIG. 6, in other example embodiments the lines 614 do not need to be straight and may have curvature.

Another possible method for plume detection may be to evaluate the number of gas concentration measurement pixels within an area 612 that exceed a multiple of the expected noise level, $C_{noise}$ (e.g., as provided by Equation 1). For example, it may be sufficient to compute the number of measurements in a possible plume area that exceed some multiple of Cnoise (e.g., measurements which exceed $2C_{noise}$). While the area 612 is shown a certain shape in FIG. 6, the area may be other shapes or sizes in other example embodiments.

The line integrals, the area concentration measurements, and/or other methods of calculating a concentration may be carried out for multiple angular directions (e.g., for multiple values of θn). Relative to the anomalous gas concentration location it may be possible to construct a concentration versus direction curve in order to determine an angular dependence of the concentration about the anomalous gas concentration location. Also, these techniques may be used to simply determine the presence of a plume, without necessarily determining the direction of the plume (or vice versa). For instance, even though each point of the dispersed tail of the plume within the shape 612 may be below a gas concentration measurement threshold, an average over the shape may enable a lower gas concentration measurement threshold and may thereby enable plume detection. Also, a thresholding step may be performed on measurements within an area 612 with a reduced threshold to further uncover possible measurements that are part of a plume.

Gas plume detection may be used as an additional filter to the measurements collected by a measurement system (e.g., measurement system 100 of FIG. 1). Since the gas concentration measurements may represent measurements of actual gas in an environment, it may be expected that the gas may diffuse outwards from a source. Because of this it may be expected that a region of anomalous (e.g., high) concentration would be associated with a plume. The gas plume detection may determine if a given high gas concentration (e.g., a suspected source 610) which has been identified as an anomalous gas concentration (e.g., by adaptive filter 218 and/or speckle filter 220 of FIG. 2) is associated with a gas plume. Anomalous gas concentrations which are not associated with a gas plume may be rejected as likely false positives. This rejection may be because it is physically unlikely to find a gas plume comprised of a single elevated measurement point in space.

The plume filter may be based on a calculation or plot of the concentration vs. a direction from the source. This plot may be normalized. A plume filter threshold relationship may be based on equation 7, below:

$$CI_{conc} \geq n \times \frac{CI_{noise}}{\sqrt{N}} \qquad \text{Eqn. 7}$$

Here, $CI_{conc}$ and $CI_{noise}$ are sums of line integrals for integration lines 614 (e.g., integration lines $L_1$ thru $L_n$), for the gas concentration and the expected gas concentration noise (e.g. from Equation 1 or from a region suspected to not have anomalous gas concentration), respectively, and N is the number of gas concentration measurements integrated over for each $CI_{conc}$ value. If CIconc is greater than or equal to the plume threshold value set by the right side of equation 7, then the anomalous gas concentration measurement used as a suspected source for calculating CIconc and CInoise, may be determined to be associated with a plume. In other words, if CIconc is greater or equal to the plume threshold, then the associated anomalous gas concentration measurement may be judged to be a true positive.

Figure 7A:
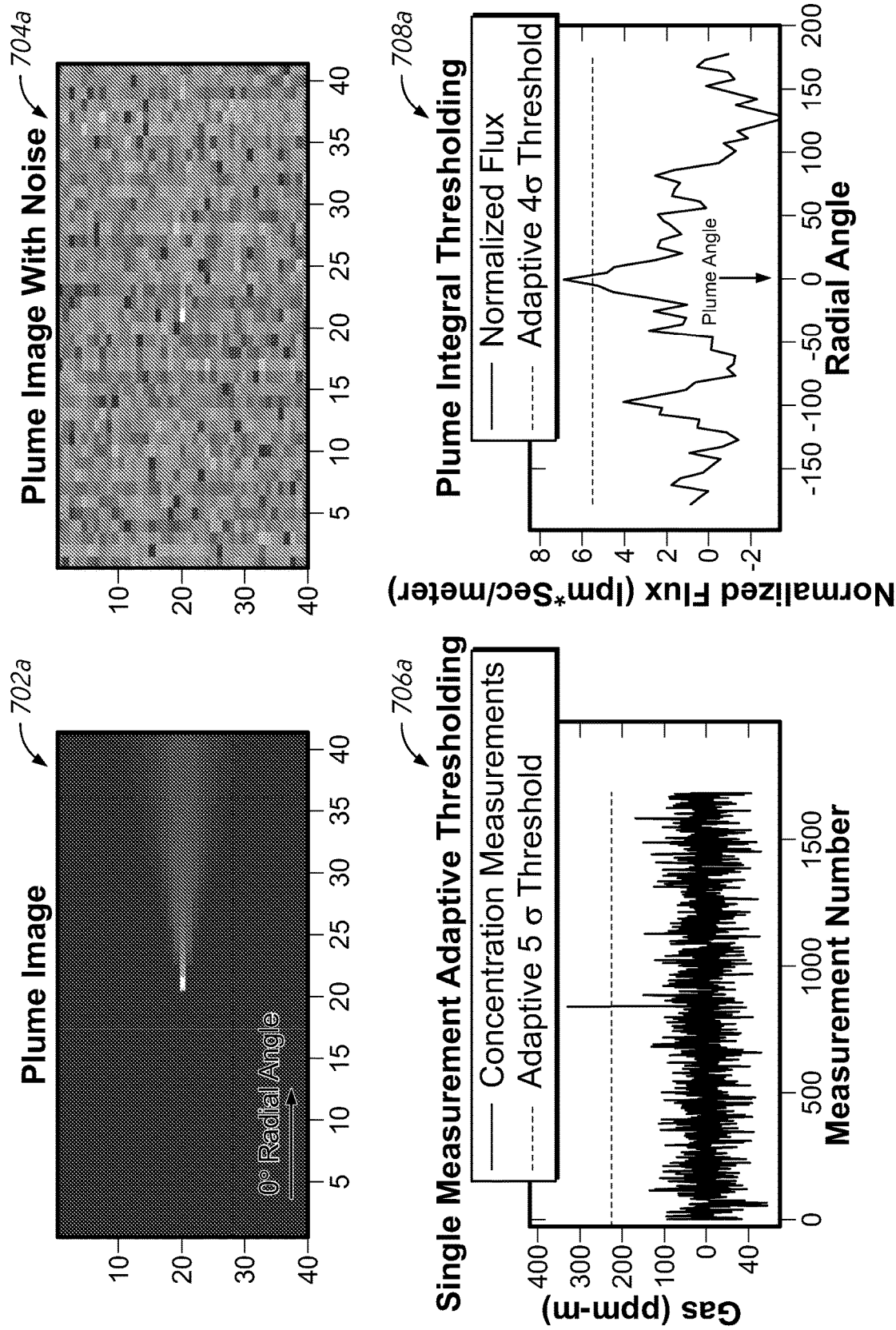
FIGS. 7A-7B are graphs depicting using plume detection as a filter according to an embodiment of the present disclosure.
Figure 7B:
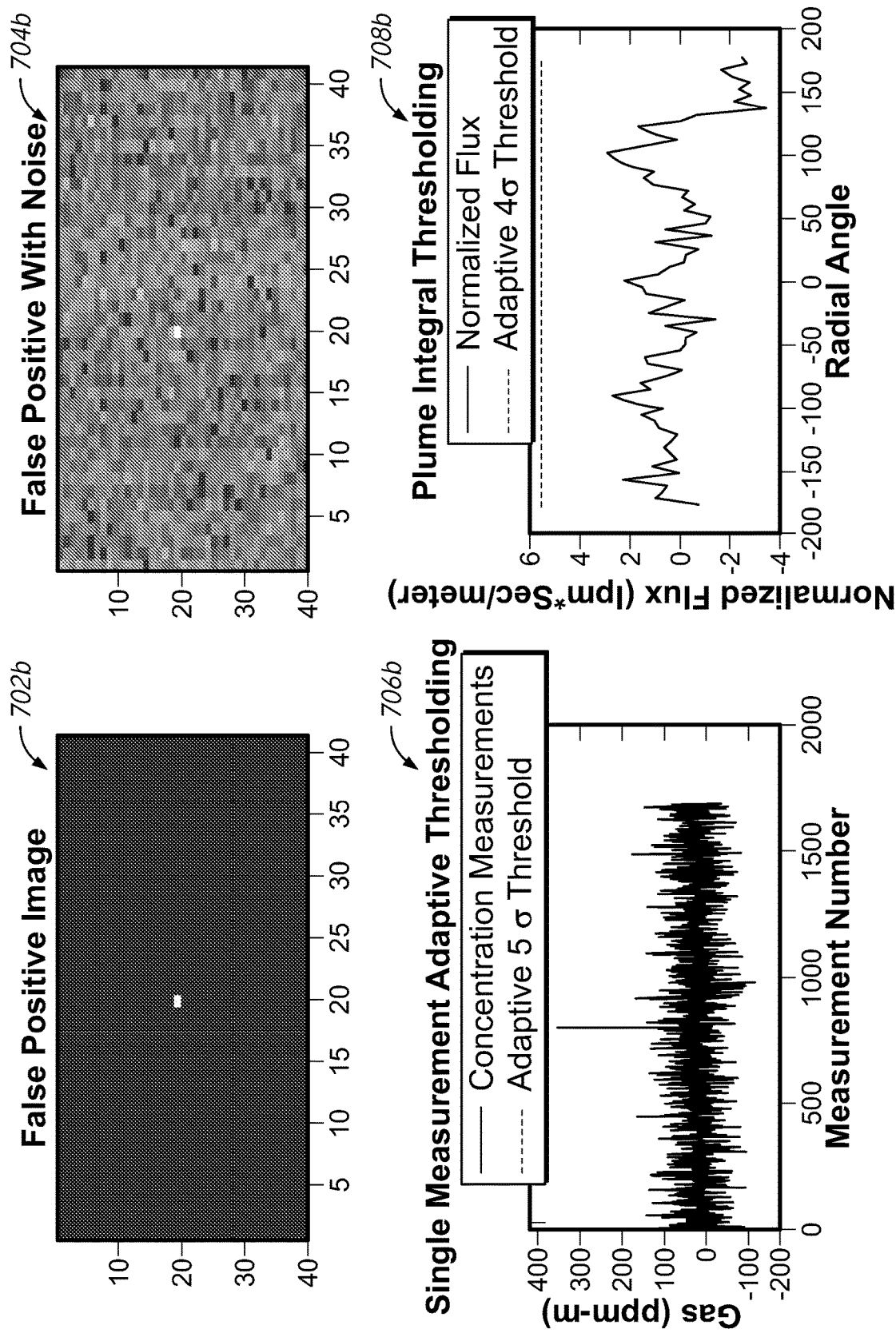

FIGS. 7A-7B are graphs depicting using plume detection as a filter according to an embodiment of the present disclosure. FIG. 7A represents a scenario where an anomalous gas concentration measurement (e.g., as identified by adaptive thresholding 218 of FIG. 2) is associated with a plume, and is retained by the plume threshold. FIG. 7B represents a scenario where the anomalous gas concentration measurement is not associated with a plume and is rejected by the plume threshold. Each of FIGS. 7A and 7B includes a respective plume image in the absence of noise 702*a* and 702*b*, a respective plume image with noise 704*a* and 704*b*, a respective adaptive threshold image 706*a* and 706*b*, and a respective plume filter image 708*a* and 708*b*. Each of the respective elements 702-708 may generally be similar between FIGS. 7A and 7B.

Plume images 702*a-b* both show a direction on the x-y axis and measured gas concentration represented as a brightness of the pixels. The plume image 702*b* represents a single anomalous measurement with no associated gas plume. The plume image 702*a* represents the same anomalous measurement as in image 702*b*, except in the image 702*a*, the anomalous measurement is associated with a plume extending towards the right of the image 702*a*. The images 702*a-b* represent an idealized measurement without noise. Images 704*a-b* each show the same data as 702*a-b* respectively, except that in the images 704*a-b*, a model of noise has been applied to the data. As may be seen, it may be difficult to visually identify the plume associated with the anomalous concentration in image 704*a* even though it is there.

Images 706*a-b* show an adaptive threshold (e.g., as in block 218 of FIG. 2) applied to the noisy data represented in the respective images 704*a-b*. The x-axis of images 706*a-b* represent a number of the measurement while y-axis represents a calculated gas concentration at that measurement number. The dashed line shows the adaptive threshold level which was determined based on the expected noise level for this set of measurements. In this example, the adaptive threshold has been set at a 5σ level. As may be seen in both images 706*a-b*, only the measurement associated with the source of the gas plume has a concentration which is greater than the adaptive threshold. Thus, in both images 704*a* and 704*b*, only a single measurement point may be identified by the adaptive threshold as being an anomalous gas concentration measurement. However, only the measurement associated with a plume in image 704*a* may represent an actual anomalous gas concentration.

Images 708*a-b* both represent a graph produced by a plume detection (e.g., plume identification 222 of FIG. 2). In both images 708*a-b* the x-axis is a rotational direction about a suspected origin, which in this case is the anomalous gas concentration measurement identified by the adaptive threshold of image 706*a-b*. The y-axis represents a normalized flux along that particular direction.

In the example of FIGS. 7A-7B, a 4σ threshold for plume detection may be computed (e.g., with Equation 7) based on line integrals of the adaptive thresholds, $C_{noise}$, corresponding to the integration paths used for the gas concentration line integrals. The threshold may be used as a way to determine the angular dependence of the gas concentration about a suspected source location. This example may illustrate how a plume that may not be visible in the gas concentration image 704*a* may still be detectable, and its direction may be determined, with high confidence. It may also be possible to use a weighted sum to perform the concentration integrals for plume detection and to determine the plume detection threshold. The gas concentration noise estimate, $C_{noise}$, for each measurement, or another similar metric, may be used as the weighting factors for such sums.

Figure 8:
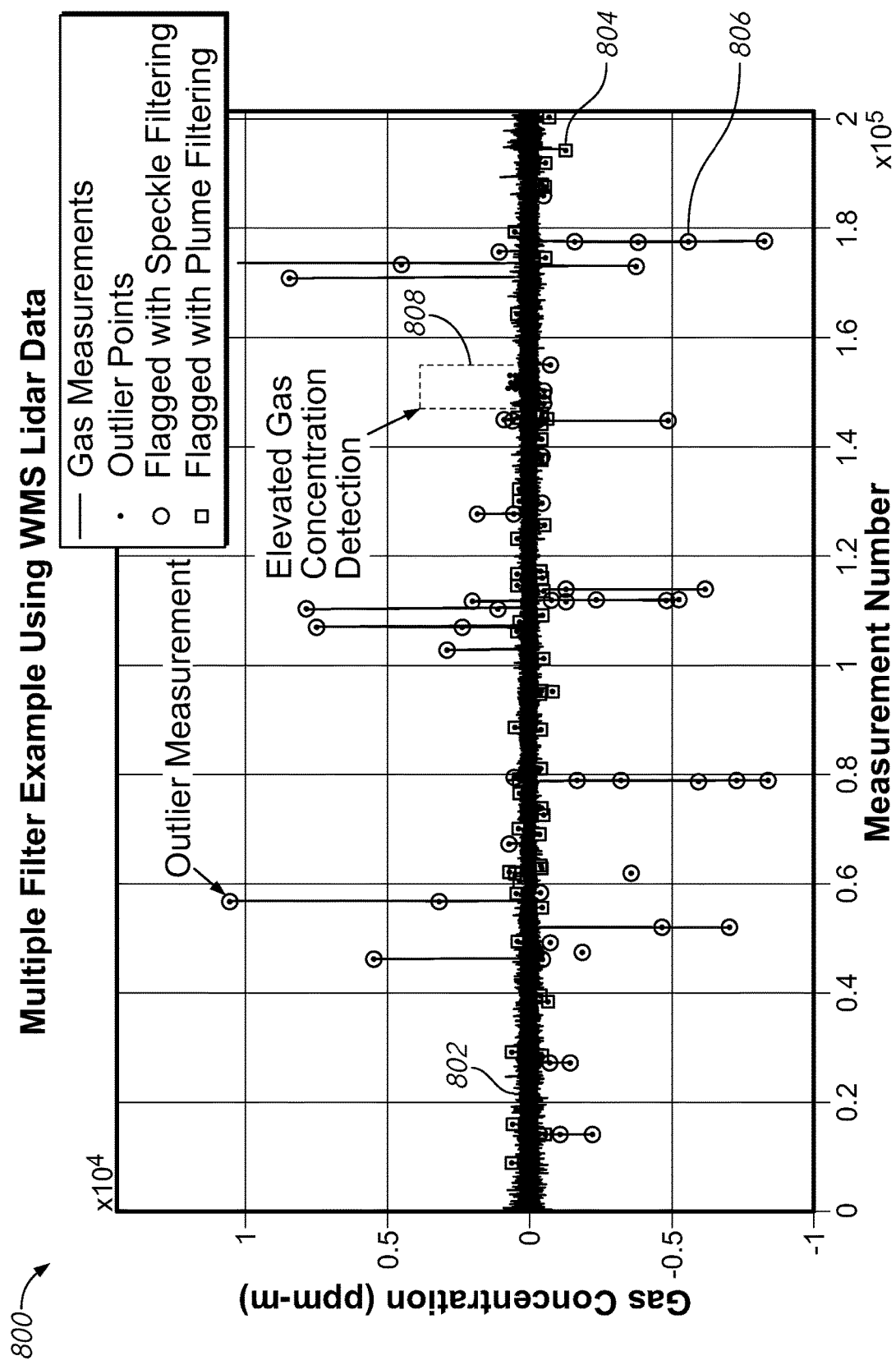
FIG. 8 is a graph depicting multiple filters applied to spectroscopy data according to an embodiment of the present disclosure.

FIG. 8 is a graph depicting multiple filters applied to measurement data according to an embodiment of the present disclosure. The graph 800 may represent how a combination of processing may be used to filter a large measurement set down to those points most likely to represent true positive anomalous gas concentrations. The x-axis of the graph 800 represents a measurement number assigned to each of the measurements. The y-axis represents the concentration calculated from that measurement.

The black line 802 represents the individual measurements. Measurements which have a small black dot are ones which have been identified as being greater than an adaptive threshold. Note that some measurements with small black dots have lower values than some measurements without black dots. This may be due to the adaptive nature of the thresholding and may not be the case for a constant thresholding method. Of the measurements which have been identified as greater than the adaptive threshold, some have been 'flagged' by the speckle filter (e.g., as in block 220 of FIG. 2). These measurements are surrounded by a circle, as represented by measurement 806. The measurements which are flagged as outliers by the speckle filter may no longer be considered as candidates for representing a true positive anomalous gas concentration. A plume filter has also been applied to the measurements. The plume filter may be applied to the measurements which are above the adaptive threshold, but have not been flagged with a speckle filter (e.g., marked with a dot but not a circle). Points which are not associated with a plume may be 'flagged' as not representing true anomalous gas concentration measurements. These may be represented by points, such as measurement 804, which are surrounded by a box.

The points which exceed the adaptive threshold, and not flagged by either the speckle filter or the plume filter, may be considered to be true positives. Since these measurements represent measurements which were not flagged by the plume filter, they may be associated with a plume. The dotted line area 808 shows a group of measurements which have been determined to represent a true positive anomalous gas concentration.

Each of the previously discussed processing steps may be associated with a confidence level which may represent a likelihood that a false detection event may be present in a given lidar data set after the processing. Each of the different processing steps (e.g., adaptive thresholding, speckle filtering, and plume detection) may have a respective probability that a false positive may occur. The false positives may represent measurements which are judged to represent anomalous gas concentrations by the filter, even though they do not.

The probability ($p_{false-at}$) of a concentration measurement exceeding the adaptive threshold (e.g., as in block 218 of FIG. 2) may be based on equation 8, below:

$$p_{false-at} = (p_{Gauss} + p_{outlier}) = \left[1 - \mathrm{erf}\left(\frac{n_{sig}}{\sqrt{2}}\right) + p_{at}\right] \quad \text{Eqn. 8}$$

where $P_{Gauss}$ is the probability of a measurement exceeding the adaptive threshold due to random noise and $p_{at}$ is the probability of a measurement following non-Gaussian statistics exceeding the adaptive threshold. The value of the adaptive threshold may be set at a value of $n_{sig} \times C_{noise}$, where $C_{noise}$ is based on equation 1 and $n_{sig}$ is a multiple applied to set the level of the threshold.

The probability ($p_{false-at}$) may be used to compute the expected number of false detection measurements $N_{false-at}$ using equation 9, below:

$$N_{false-at} = p_{false-at} \times N_{meas} \quad \text{Eqn. 9}$$

where Nmeas is the number of measurements in given set of measurements.

The probability of observing a false detection measurement ($p_{false-si}$) after application of the speckle filter step (e.g., as in block 220 of FIG. 2) may be based on equation 10, below:

$$p_{false-si} = p_{Gauss} \circ p_{outlier} p_{si} \quad \text{Eqn. 10}$$

where $p_{si}$ is the probability of an outlier measurement not being identified by the speckle filter.

The probability ($p_{false-si}$) may be used to compute the expected number of false detection events using equation 11, below:

$$N_{false-si} = p_{false-si} \times N_{meas} \qquad \text{Eqn. 11}$$

The probability of observing a false plume detection ($p_{false-plume}$) after application of the speckle interference filter and the plume detection filter may be determined based on equation 12, below:

$$p_{false-plume} = (p_{Gauss} + p_{outlier} p_{si})\left(1 - \text{erf}\left(\frac{n_{sig-plume}}{\sqrt{2}}\right)\right) + p_{plume} \qquad \text{Eqn. 12}$$

where $n_{sig-plume}$ is the random noise threshold for plume detection filter (e.g., n in Equation 7) and $p_{plume}$ is the probability of a false plume detection event not being identified by the plume detection filter.

The probability of observing a false positive such as a false detection measurement (or plume) in a lidar gas concentration data set before and after each filtration step may be determined based on the previously computed probabilities. The probability of observing at least one false detection ($p_{fd}$) in a data set may be computed using equation 13, below:

$$p_{fd} = \binom{n}{k} p^k (1-p)^n \qquad \text{Eqn. 13}$$

where p is the probability of observing a false detection measurement (or plume) from Equations 8, 10, or 12, n is the number of measurements in the data set and k=0. Other measurement expectation parameters may also be computed using similar statistical analysis, such as detection confidence of anomalous gas concentration.

Estimation of the detection confidence for individual gas concentration measurements may be complicated by the presence of outlier measurements that may assume values covering much of the gas concentration measurement range. However, plume detection may be much less sensitive to the presence of outlier measurements, and therefore may permit computation of reliable detection confidence estimates. The confidence that may be assigned to a plume detection ($p_{det}$) in a data set may be computed using equation 14, below:

$$p_{det} = \binom{n}{k} p_{false-plume}^k (1 - p_{false-plume})^n \qquad \text{Eqn. 14}$$

where the computation of ($p_{false-plume}$) may be performed using a value for $n_{sig-plume}$ determined by the plume detection peak height and the plume detection noise.

In an example calculation, the plume detection shown in image 708a of FIG. 7A would result in $n_{sig-plume}$=5 because the peak height is 1σ above the 4σ adaptive threshold. If this plume was detected in the data set shown in FIG. 8, application of equation 14 would result in an anomalous gas concentration detection confidence for this plume of 99.99%. In this case, the seemingly high detection confidence in such a small plume, relative to the measurement noise, may rely on the assumption that $p_{plume}$<1E−9. The confidence in any given plume detection may ultimately be limited by the value of $p_{plume}$, which may be determined empirically and may be a function of other plume attributes such as size or other contextual information. To further reduce the sensitivity of plume detection to outlier measurements it may be desirable to remove one or more outliers from the area where the plume detection algorithm will be applied. Removal of the point identified as the emission source may guard against a false positive plume detection in the event that that point is an outlier measurement.

For brevity, the operation of the optical systems herein have generally been described with respect to light being emitted by the optical system towards a target area. However, one of skill in the art would appreciate that since optical paths may typically be reversible, the beam path may also represent a field of view 'seen' by the optical system (e.g., reach a receiver of the optical system).

Certain materials have been described herein based on their interaction with light (e.g., opaque, reflective, transmissive, etc.). These descriptors may refer to that material's interactions with a range of wavelength(s) emitted by the system and/or that the receiver is sensitive to. It would be understood by one of skill in the art that a given material's properties vary at different ranges of wavelengths and that different materials may be desired for different expected ranges of wavelength(s). The description of a particular example material is not intended to limit the disclosure to a range of wavelengths over which that particular example material has the desired optical properties. The term 'light' may be used throughout the spectrum to represent electromagnetic radiation, and is not intended to limit the disclosure to electromagnetic radiation within the visible spectrum. The term 'light' may refer to electromagnetic radiation of any wavelength.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
scanning laser light across a target area from an aerial platform;
receiving light from the target area;
recording a set of gas concentration measurements based on the received light;
filtering anomalous ones of the set of gas concentration measurements;
identifying a gas plume based on a spatial relationship between at least some of the anomalous ones of the set of gas concentration measurements; and
determining location information of the identified gas plume.

2. The method of claim 1, wherein the filtering the anomalous ones of the set of gas concentration measurements is based on a noise model.

3. The method of claim 2, wherein the noise model depends on the received light.

4. The method of claim 2, wherein the noise model depends on measurement conditions.

5. The method of claim 2, wherein the filtering based on the noise model includes determining an expected gas concentration noise based on ones of the gas concentration measurements associated with a region of the target area suspected to not have the anomalous ones of the set of gas concentration measurements.

6. The method of claim 1, wherein the filtering anomalous ones of the set of gas concentration measurements includes defining a subset of the plurality of gas concentration measurements.

7. The method of claim 6, further comprising averaging over the subset of gas concentration measurements.

8. The method of claim 6, further comprising applying a metric to weight the subset of gas concentration measurements.

9. The method of claim 8, wherein the applied metric is a number of gas concentration measurements amongst the subset that exceed a threshold.

10. The method of claim 8, wherein the threshold is a multiple of an expected noise level.

11. The method of claim 6, wherein the subset of gas concentration measurements corresponds to a portion of the target area.

12. The method of claim 11, wherein the subset of gas concentration measurements within the portion of the target area is averaged.

13. The method of claim 1, wherein the filtering anomalous ones of the set of gas concentration measurements is based on an adaptive threshold.

14. The method of claim 1, wherein the filtering anomalous ones of the set of gas concentration measurements is based on an indication of speckle noise.

15. The method of claim 1, wherein the filtering anomalous ones of the set of gas concentration measurements is based on a harmonic of a wavelength modulation frequency.

16. The method of claim 15, wherein the filtering the anomalous ones of the set of gas concentration measurements is based on a phase of the harmonic of the wavelength modulation frequency.

17. The method of claim 16, wherein the filtering is based on a first harmonic of the wavelength modulation frequency.

18. The method of claim 1, further comprising determining a direction of the gas plume.

19. The method of claim 1, further comprising determining a source of the gas plume.

20. The method of claim 19, further comprising determining a location of the source of the gas plume.

21. The method of claim 1, wherein the determining the location information includes a measurement of distance to the target area.

22. The method of claim 1, wherein the determining the location information includes a GPS measurement.

23. The method of claim 1, further comprising overlaying the gas plume image onto a map.

24. An apparatus comprising:
an aerial platform;
a laser source configured to generate a laser beam;
a scanner configured to scan the laser beam across a target area;
a receiver configured to receive light from the target area;
a processor; and
a memory, the memory encoded with executable instructions which, when executed by the at least one processor, cause the apparatus to:
record gas concentration measurements based on the received light;
identify and filter anomalous ones of the gas concentration measurements;
identify a gas plume based on a spatial relationship between at least some of the anomalous ones of the set of gas concentration measurements; and
determine location information of the identified gas plume.

25. The apparatus of claim 24, wherein the receiver is configured to measure an amount of received light, and
wherein the executable instructions when executed by the at least one processor, further cause the apparatus to:
determine a threshold based on a noise model and the amount of received light; and
identify the anomalous ones of the gas concentration measurements based on the threshold.

26. The apparatus of claim 24, wherein the laser source is configured to modulate a wavelength of the laser beam at a wavelength modulation frequency, and
wherein the executable instructions when executed by the at least one processor, further cause the apparatus to identify and filter the anomalous ones of the gas concentration measurements based on at least one harmonic of the wavelength modulation frequency.

27. The apparatus of claim 24, wherein the executable instructions when executed by the at least one processor, further cause the apparatus to:
determine spatial coordinates associated with the gas concentration measurements; and
group subsets of the plurality of gas concentration measurements based on the associated spatial locations within the target area, wherein each of the grouped subsets is associated with a portion of the target area; and
identify the gas plume based on one or more of the grouped subsets.

28. The apparatus of claim 24, wherein the scanner comprises a rotating angled reflector.

29. The apparatus of claim 24, wherein the aerial platform is an unmanned aerial vehicle.

30. The apparatus of claim 24, wherein the aerial platform is configured to move relative to target area.

* * * * *